United States Patent
Oosthuizen et al.

(10) Patent No.: US 11,538,034 B2
(45) Date of Patent: Dec. 27, 2022

(54) PROVIDING COMPUTER-GENERATED CONTEXTUAL DATA TO AN END-POINT DURING A DIGITAL TRANSACTION

(71) Applicant: ENTERSEKT INTERNATIONAL LIMITED, Ebene (MU)

(72) Inventors: Gerhard Gysbert Oosthuizen, Stellenbosch (ZA); Daniël Deetlefs Bester, Stellenbosch (ZA); Tertius Wessels, Stellenbosch (ZA); Jonathan Daniel Van Der Merwe, Stellenbosch (ZA)

(73) Assignee: ENTERSEKT INTERNATIONAL LIMITED, Ebene (MU)

( * ) Notice: Subject to any disclaimer, the term of this patent is extended or adjusted under 35 U.S.C. 154(b) by 0 days.

(21) Appl. No.: 17/286,082

(22) PCT Filed: Oct. 17, 2019

(86) PCT No.: PCT/IB2019/058854
§ 371 (c)(1),
(2) Date: Apr. 16, 2021

(87) PCT Pub. No.: WO2020/079631
PCT Pub. Date: Apr. 23, 2020

(65) Prior Publication Data
US 2021/0374740 A1    Dec. 2, 2021

(30) Foreign Application Priority Data
Oct. 17, 2018    (ZA) .................................. 2018/06913

(51) Int. Cl.
*G06Q 20/40*    (2012.01)
(52) U.S. Cl.
CPC .................................. *G06Q 20/401* (2013.01)

(58) Field of Classification Search
None
See application file for complete search history.

(56) References Cited

U.S. PATENT DOCUMENTS 7,739,252 B2 *    6/2010    Kumar .................... G06F 9/466
                                                           707/704
9,704,174 B1    7/2017    McGhie et al.
(Continued)

FOREIGN PATENT DOCUMENTS

WO    WO2015/001452 A1    1/2015

OTHER PUBLICATIONS

International Search Report and Written Opinion of the International Search Authority for International Patent Application No. PCT/IB2019/058854, dated Jan. 13, 2020 in 8 pages.

*Primary Examiner* — Bruce I Ebersman
*Assistant Examiner* — Matthew Cobb
(74) *Attorney, Agent, or Firm* — Knobbe, Martens, Olson & Bear, LLP

(57) ABSTRACT

A system and method for providing computer-generated contextual data to an end-point during a digital transaction is provided. A method includes receiving a trigger message relating to a digital transaction between a consumer and a second entity. The trigger message includes a consumer identifier uniquely associated with the consumer and transaction details at least including a characteristic associated with the digital transaction. A data message including information based on an evaluation of the transaction details against a consumer-linked transaction matrix is obtained. The consumer-linked transaction matrix is linked to the consumer and includes information relating to the digital transaction. The data message is transmitted to a remote device with which the consumer interacts during pendency of the transaction and is configured to cause the device to (Continued)

output a prompt to the consumer displaying the data message.

18 Claims, 7 Drawing Sheets

(56) References Cited

U.S. PATENT DOCUMENTS

| | | | |
|---|---|---|---|
| 10,748,131 B2* | 8/2020 | Tseretopoulos | G06Q 20/3223 |
| 10,977,652 B1* | 4/2021 | Twilley | G06Q 20/4016 |
| 11,232,443 B2* | 1/2022 | Sauer | G06Q 20/40 |
| 2012/0101881 A1 | 4/2012 | Taylor et al. | |
| 2014/0222682 A1* | 8/2014 | Dua | G06Q 20/322 |
| | | | 705/44 |
| 2016/0104251 A1* | 4/2016 | Prakash | G06Q 20/325 |
| | | | 705/30 |
| 2016/0224981 A1* | 8/2016 | Radu | G06Q 20/405 |
| 2018/0089679 A1* | 3/2018 | Castinado | G06Q 20/108 |
| 2018/0137504 A1* | 5/2018 | Goldenberg | G06Q 20/4016 |
| 2020/0065927 A1* | 2/2020 | Sauer | G06Q 50/28 |

* cited by examiner

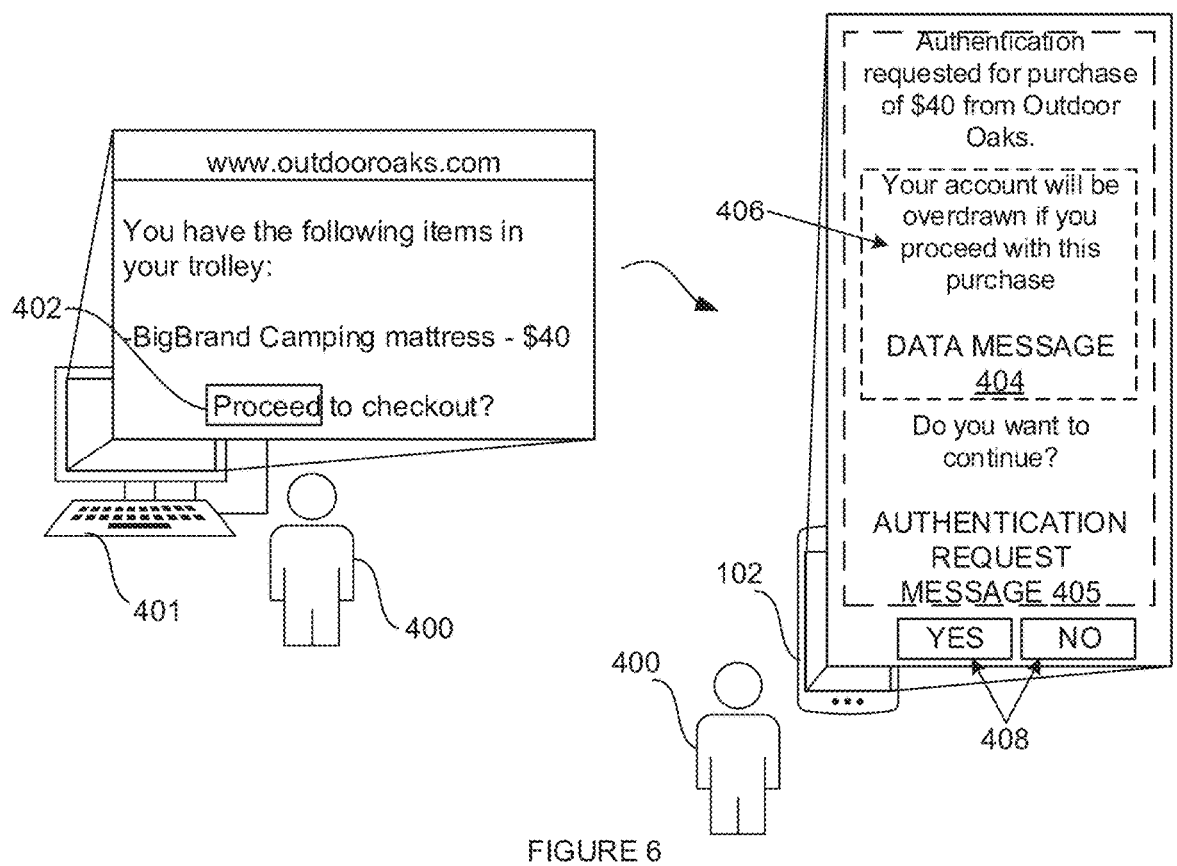
FIGURE 6
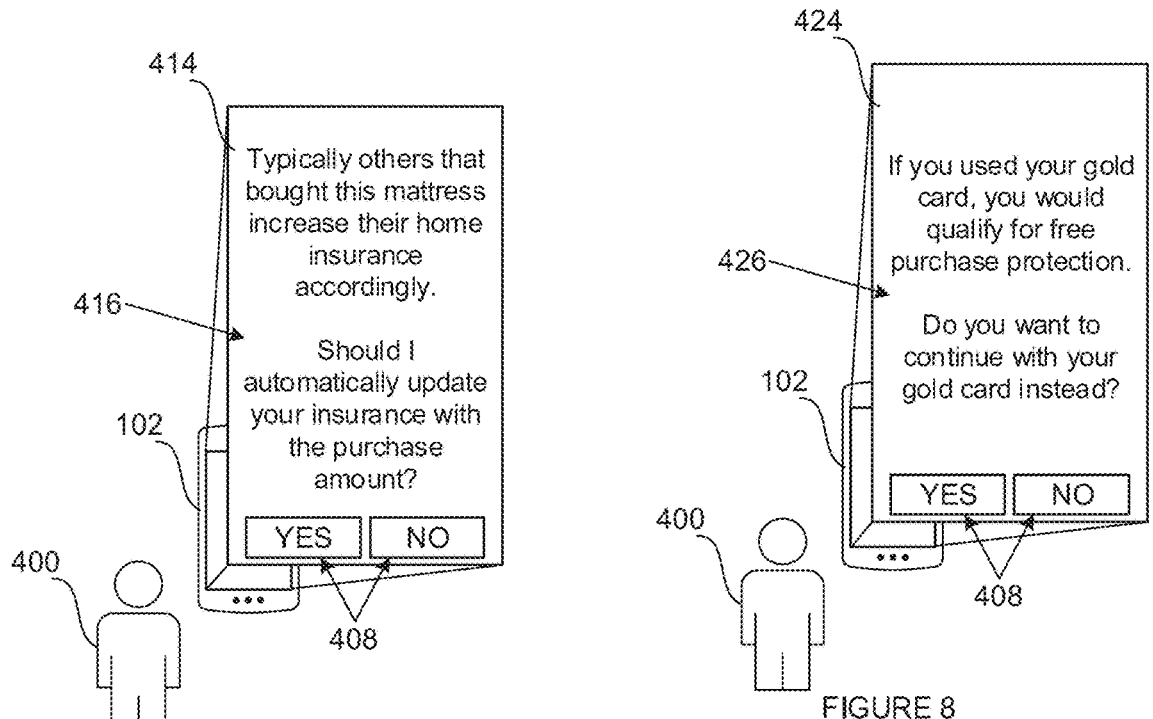
FIGURE 7
FIGURE 8

PROVIDING COMPUTER-GENERATED CONTEXTUAL DATA TO AN END-POINT DURING A DIGITAL TRANSACTION

CROSS-REFERENCE(S) TO RELATED APPLICATIONS

This application is the U.S. National Phase under 35. U.S.C. § 371 of International Application PCT/IB2019/058854, filed Oct. 17, 2019, which claims priority from South African provisional patent application number 2018/06913 filed on 17 Oct. 2018, which is incorporated by reference herein.

FIELD OF THE INVENTION

This invention relates to a system and method for providing computer-generated contextual data to an end-point during a digital transaction.

BACKGROUND TO THE INVENTION

In the context of digital financial transactions in which a consumer purchases goods or services from a merchant, a trusted party may desire to provide computer-generated contextual data relating to the transaction during the transaction (e.g. while the consumer is in the process of making the purchase from the merchant).

US 2016/0104251 A1, for example, provides a method and system which provides the user of a computing device with information, analysis, suggestions and/or recommendations relating to the user's financial information and/or purchasing history, in relation to an electronic commerce transaction initiated by the user at the computing device, prior to, during, or after completion of the electronic commerce transaction.

However, a problem which remains to be addressed is providing the computer-generated contextual data to the consumer before the transaction has been finalised in a manner which allows the consumer to act on the data. There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method conducted at a server computer comprising:
  receiving, from a remote device via a data communication network, a trigger message relating to a digital transaction between a consumer and a second entity, the trigger message including a consumer identifier uniquely associated with the consumer and transaction details including a characteristic associated with the digital transaction, wherein the trigger message is received during pendency of the digital transaction;
  obtaining a data message including information based on an evaluation of the transaction details against a consumer-linked transaction matrix, the consumer-linked transaction matrix being linked to the consumer and at least including information relating to the digital transaction; and,
  transmitting, via a data communication network, the data message to a remote device with which the consumer interacts, wherein the data message is transmitted during pendency of the transaction and is configured to cause the remote device with which the consumer interacts to output a prompt to the consumer displaying the data message.

Further features provide for the trigger message to be a transaction instruction message received from a consumer device or transaction request message received from a second device; for the second entity to be a merchant and for the trigger message to be an authorization request message received from a merchant device via a payment network or a Payer Authentication Request message received from a merchant device.

Still further features provide for the second entity to be a merchant and for the remote device with which the consumer interacts to be a merchant device or a consumer device; for the remote device with which the consumer interacts to be a consumer device, and for the data message to be included in an authentication request message transmitted to the consumer device, the authentication request message including at least a subset of the transaction details and prompting the consumer to authenticate the transaction.

Yet further features provide for the server computer to be operated or maintained by or on behalf of a third party to both the consumer and the second entity; for the third party to be a financial institution associated with the consumer and maintaining a financial account against which the consumer transacts, such as an issuing financial institution; and for the server computer to be an issuer server computer.

Even further features provide for the method to include generating and maintaining the consumer-linked transaction matrix, including accessing financial account data associated with a plurality of consumers; and for the server computer to have access to a financial account database in which records including data relating to the financial accounts of respective consumers are stored.

Further features provide for the data message to be configured to prompt the consumer for a response, and for the response to be an instruction to alter, proceed with or to cancel the transaction; and, for the method to include receiving a data response message from the device, the data response message instructing continuance or termination of the transaction; and, in response to receiving a data response message instructing continuance of the transaction, processing the transaction against a financial account associated with the consumer in favour of a financial account associated with the merchant.

Still further features provide for obtaining the data message to include: identifying a transaction matrix linked to the consumer, the consumer-linked transaction matrix at least including information relating to the digital transaction; evaluating the transaction details against the consumer-linked transaction matrix; and, generating the data message including information based on the evaluation and being relevant to the consumer.

Even further features provide for evaluating the transaction details against the consumer-linked transaction matrix to include evaluating consistency of the transaction details against the consumer-linked transaction matrix; and, if the transaction details are inconsistent with the consumer-linked transaction matrix, for the data message to include information relating to the inconsistency.

Yet further features provide for the method to include, if the transaction details are consistent with the consumer-linked transaction matrix, generating and transmitting a data message including information relating to the consistency.

Further features provide for the method to include generating and maintaining the consumer-linked transaction matrix; for generating the consumer-linked transaction matrix to include: classifying the consumer into a consumer category; identifying other consumers falling into the same category; and, identifying transaction habits associated with the consumers in the consumer category; and, for the server computer to have access to financial account data associated with a plurality of consumers and for identifying other consumers to be based on the financial account data.

Still further features provide for the consumer-linked transaction matrix to include information relating to particular transactions, and for evaluating consistency of the transaction details against the consumer-linked transaction matrix to include comparing the transaction details to similar transactions stored in the consumer-linked transaction matrix.

Still further features provide for the data message to include information relating to remedying the inconsistency; and for the information relating to remedying the inconsistency to include a computer-generated suggestion as to an alternative transaction.

Further features provide for the information relating to the digital transaction to include one or both of information relating to transaction activity of a category of consumers into which the consumer falls, information relating to transaction activity of the consumer; for the information included in the data message to include an insight and an associated action; for the consumer identifier to be in the form of or to include source of funds data; and for wherein the transaction details to include one or more of an amount associated with the transaction, the merchant identifier, a digital transaction identifier, a merchant type identifier, a description of the transaction, details of goods or services associated with the transaction, and line item detail associated with the goods or services associated with the transaction.

A yet further feature provides for the characteristic associated with the transaction to include one or more of: a second entity identifier, a merchant type identifier, a description of the transaction, details of goods or services associated with the transaction, and the like.

In accordance with another aspect of the invention there is provided a system comprising: a processor and a memory configured to provide computer program instructions to the processor to execute functions of components; a trigger message receiving component for receiving, from a remote device via a data communication network, a trigger message relating to a digital transaction between a consumer and a second entity, the trigger message including a consumer identifier uniquely associated with the consumer and transaction details including a characteristic associated with the digital transaction, wherein the trigger message is received during pendency of the digital transaction; a data message obtaining component for obtaining a data message including information based on an evaluation of the transaction details against a consumer-linked transaction matrix, the consumer-linked transaction matrix being linked to the consumer and at least including information relating to the digital transaction; and, a data message transmitting component for transmitting, via a data communication network, the data message to a remote device with which the consumer interacts, wherein the data message is transmitted during pendency of the transaction and is configured to cause the remote device with which the consumer interacts to output a prompt to the consumer displaying the data message.

In accordance with another aspect of the invention there is provided a computer program product comprising a computer-readable medium having stored computer-readable program code for performing the steps of: receiving, from a remote device via a data communication network, a trigger message relating to a digital transaction between a consumer and a second entity, the trigger message including a consumer identifier uniquely associated with the consumer and transaction details including a characteristic associated with the digital transaction, wherein the trigger message is received during pendency of the digital transaction; obtaining a data message including information based on an evaluation of the transaction details against a consumer-linked transaction matrix, the consumer-linked transaction matrix being linked to the consumer and at least including information relating to the digital transaction; and, transmitting, via a data communication network, the data message to a remote device with which the consumer interacts, wherein the data message is transmitted during pendency of the transaction and is configured to cause the remote device with which the consumer interacts to output a prompt to the consumer displaying the data message.

Further features provide for the computer-readable medium to be a non-transitory computer-readable medium and for the computer-readable program code to be executable by a processing circuit.

Embodiments of the invention will now be described, by way of example only, with reference to the accompanying drawings.

BRIEF DESCRIPTION OF THE DRAWINGS

In the drawings:

FIG. 6 is a schematic diagram which illustrates an exemplary in-use scenario of the described system and method from the perspective of a consumer;

FIG. 7 is a schematic diagram which illustrates another exemplary data message that may be generated according to aspects of the system and method described herein;

FIG. 8 is a schematic diagram which illustrates yet another exemplary data message that may be generated according to aspects of the system and method described herein.

DETAILED DESCRIPTION WITH REFERENCE TO THE DRAWINGS

Figure 1:
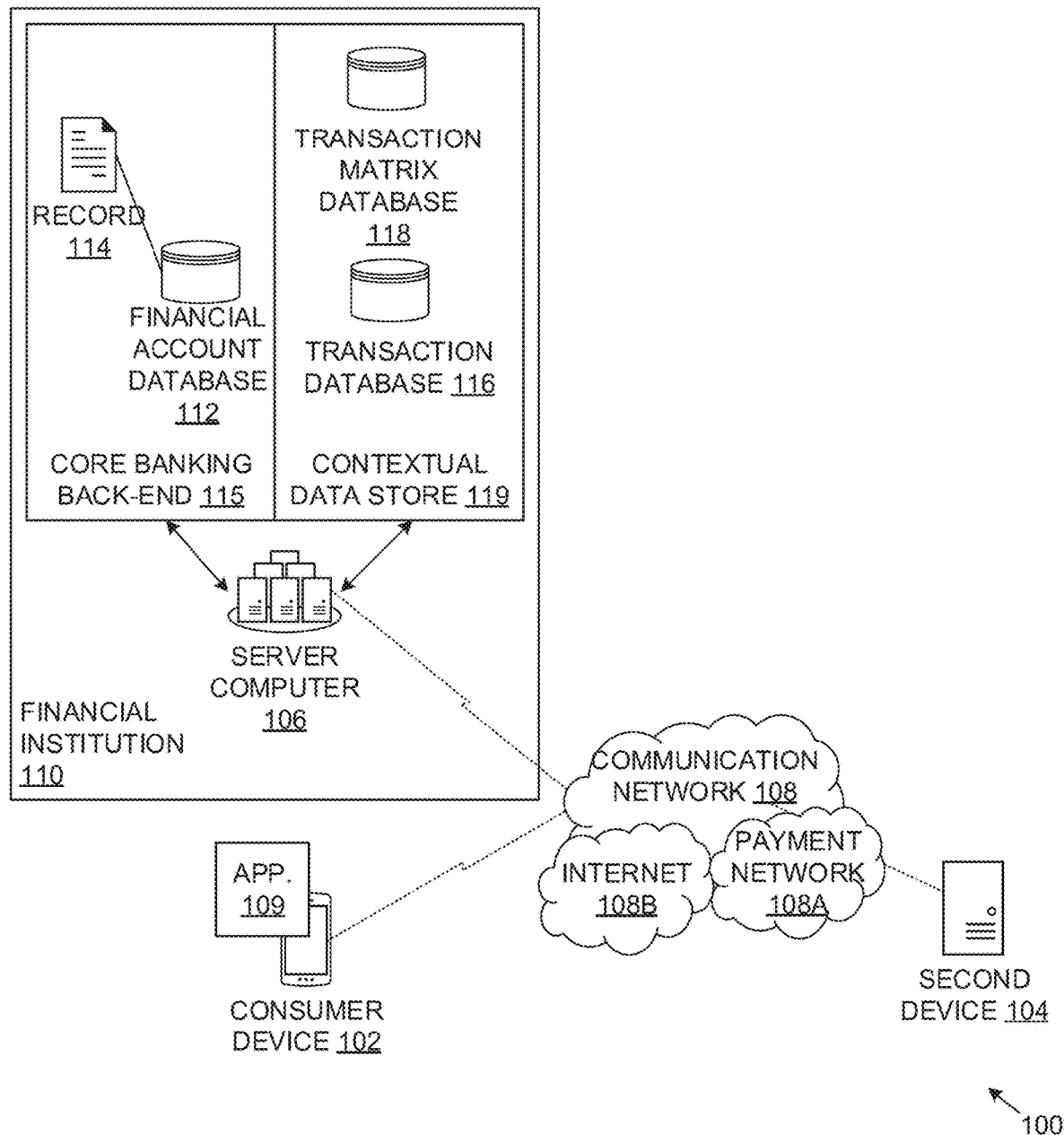
FIG. 1 is a schematic diagram which illustrates an exemplary system for providing computer-generated contextual data to an end-point during a digital transaction.

Aspects of the disclosure provide a system and method for providing computer-generated contextual data to an end-point during a digital transaction. The transaction may be a financial transaction, such as payment in exchange for goods or services, requests for access to financial data or the like. Aspects of the disclosure anticipate e-commerce-, bricks-and-mortar- and direct debit-based implementations in which computer-generated contextual data is generated and transmitted to a consumer at the point of purchase in real-time while the consumer is conducting a digital transaction. The transaction may be a digital transaction in that its completion requires routing of messages in a data communication network.

Contextual data refers to data that relates to the transaction, for example by providing more information on the transaction, information on the effect that the transaction will have on the consumer (financially, practically, privacy-wise, etc.), information on similar transactions, (aggregated) information on consumers that have entered into similar transactions and the like. The contextual data may be data that informs on the setting of the transaction. In some implementations, contextual data may be in the form of insights or advice. The contextual data may for example provide an assessment of the financial health impact of the transaction on the consumer. The contextual data may include a call to action or prompt, for example, a suggestion that other products/services be purchased during the pending transaction as well or that the pending transaction be cancelled and entered into elsewhere; at a later point in time; in relation to other goods or services; or the like.

The contextual data may be generated at and transmitted from a financial institution with which the consumer has a trusted relationship (such as a financial institution with whom the consumer has a financial account). In this sense, the contextual data may be more likely to be trusted by the consumer—and hence may be 'trusted contextual data', 'trusted insights' or 'trusted advice'. As will be explained in greater detail below, aspects of the present disclosure may leverage the functionality via which consumers provide real time approval for transactions to generate and deliver the computer-generated contextual data to the consumer.

Aspects of this disclosure may allow for trusted contextual data to be generated by a financial institution associated with the consumer (e.g. an issuing financial institution) evaluating a pending transaction against: the consumer's spend history, related consumers' spend history and other factors (such as similar transactions). The contextual data may be pushed to a device with which the consumer can interact while completing the transaction. The device to which the contextual data is pushed can be a merchant device, the consumer's mobile device or the like. The merchant device may for example be a point of sales terminal, personal PIN entry device, etc. in a bricks-and-mortar implementation or a merchant payment services provider, PSP, in the case of an e-commerce implementation. The contextual data may be pushed to the device before the consumer finalizes the transaction. The contextual data may be generated and pushed to the device in real-time while the consumer conducts the transaction. The contextual data may need to be generated and pushed to the device before expiry of any applicable transaction timeout periods (e.g. that may be stipulated by the merchant, card associations, financial institutions or the like).

Aspects of the present disclosure may be integrated into various digital transaction systems, such as Web Payments-, Secure Remote Commerce- (SRC-), Three-Domain Secure- (3DS-) and issuer wallet-based digital payment systems, Open Banking-based-digital transaction systems and the like.

FIG. 1 is a schematic diagram which illustrates an exemplary system for providing computer-generated contextual data to an end-point during a digital transaction. The system (100) may include a consumer device (102), a second device (104) and a server computer (106).

The consumer device (102) may be operated by a consumer. The second device may be operated by a merchant in an exemplary scenario in which the consumer wishes to purchase goods and/or services from the merchant, in which scenario the second device may be referred to as a "merchant device". The merchant may be associated with one or both of a merchant identifier which uniquely identifies the merchant and a merchant type identifier (e.g. a merchant category code). Although only one consumer device and one second device are illustrated, it should be appreciated that in a practical implementation, there may be a plurality of each of these. In other implementations, the second device may be operated by an account information service provider (AISP) or payment initiation service provider (PISP) in an open banking scenario, for example, in which an AISP or PISP can interact with records (114) relating to the financial accounts on behalf of consumers.

The devices and server computer may communicate with each other via an appropriate communication network (108). The communication network may be a data communication network. The term communication network is used generally to refer to a network via which electronic device can exchange data and/or digital messages with one another over vast geographical distances. The communication network (108) may be made up of a number of different networks (or a number of different networks may run on the communication network). In some implementations, the respective devices may communicate with the server via different communication networks. For example, in some implementations, the second device (104) may communicate with the server computer (106) via a payment network (108A), such as VISANET (a trade mark of VISA, INC.) or similar payment processing network. The payment network may be a card association network. The payment network may include one or both of a directory server (such as a 3DS enabled directory server) and an SRC system for interfacing with various SRC components described herein. In other implementations, the second device (104) may communicate with the server computer (106) via a publicly accessible communication network, such as the Internet (108B). The consumer device (102) and server computer (106) may communicate via a publicly accessible communication network, such as the Internet (108B).

The consumer device (102) may be any suitable computing device capable of communicating on the communication network (108). The consumer device may be a portable electronic device, such as a mobile phone (or smart phone), tablet computer, wearable computing device, personal digital assistant, laptop computer or the like. In some implementations, the consumer device may be less portable and may, for example, be in the form of a desktop computer, smart appliance or the like. The consumer device (102) may be associated with a communication address via which messages may be directed to the consumer device via the communication network (108).

In some implementations, the consumer device has a software application (109) installed and executing thereon. The software application may be a payment application and/or transaction authentication/authorization application which enables payment and/or authentication/authorization functionality of the consumer device. The software application (109) may be configured to establish a secure communication channel with the server computer (106). The secure communication channel may for example be established using transport layer security (TLS) or secure sockets layer (SSL) techniques. Establishing the secure communication channel may entail a digital certificate exchange process and the sharing of encryption keys. Digital certificates may be issued to the software application and server computer by a certificate authority (CA). In the case of the software application, the digital certificate may be linked to a public and private key pair having been created on the consumer device by the software application. Messages signed by the private key may thus be validated as having originated from the consumer device (or software application) by the server computer using known public key infrastructure techniques.

In some implementations, the software application (109) may provide payment application functionality as described in the W3C Web Payments specification which is known to those skilled in the art. The software application may be configured to communicate with a mediator (such as a web-browser) for transmitting and receiving payment requests and payment responses to a payment network and/or a payor (being the merchant). In some implementations, the software application may be a payment application having issuer wallet functionality. The software application may for example be under the control of the issuing financial institution and may be configured for making and authorizing payments using source of funds data linked to the user's account at the issuing financial institution. In some implementations, the software application may be a digital card facilitator (DCF) enabled payment application for providing access to information for use in an SRC-type digital transaction.

The software application (109) may securely store and/or generate source of funds data. Source of funds data include one or more of: payment card details (such as cardholder name, primary account number (PAN), expiry date, card verification value (CVV) or similar); tokenized payment card details (such as a tokenized PAN, expiry date and/or CVV, which may be issued to the software application by a token service and which may be dynamic) or other tokenization information (such as a limited use key, etc.); financial account details (e.g. account number, branch code, etc. for performing direct debit transactions); a cryptocurrency wallet address or similar data for performing cryptocurrency-based payments; an encryption key usable in identifying a source of funds; a cryptogram; an application cryptogram (AC) card key; an AC master key; a pointer to any of the foregoing (such as a consumer identifier and/or cryptographic pointer); and the like. Source of funds data may include or map to the consumer identifier which uniquely identifies the consumer to the financial institution (110). Source of funds data may thus be uniquely linked to the consumer and may identify the consumer to the issuing financial institution.

Source of funds data may be transmitted to the server computer, merchant device, mediator or an SRC system as a payment method for use in initiating a transfer of funds from a financial account associated with the source of funds (and typically with the consumer). In some implementations, multiple sets of source of funds data may be securely stored by the software application. The software application may further store registered credentials, such as a registered passcode or registered biometric for authenticating the consumer prior to performing sensitive digital transactions.

The second device (104) may be provided by a suitable computing device capable of communicating on the communication network. The second device (104) may take on various forms, depending on the particular implementation. The second device may for example be in the form of a point-of-sale device typically found in a bricks-and-mortar retail store. In other implementations, the second device may be in the form of a server computer configured to provide payment processing functionality of an e-commerce-based merchant. In other cases, the second device may be in the form of a smart phone or tablet computer, as may for example be found in small-scale merchant outlets (e.g. mom and pop shops, etc.). Depending on the implementation, the second device (104) may implement or have access to one or more of: a merchant plug-in for three-domain secure-type authentication of transactions; an SRC initiator component and/or digital payment application (DPA) for SRC-type digital transactions; and a merchant code server. The SRC initiator component may be configured to facilitate the collection and transmission of digital card and check out information on behalf of the DPA to enable the initialization of a payment. The DPA may be a payment enabled application that facilities the SRC consumer experience.

The server computer (106) may be provided by any appropriate computing device configured to perform a server role and capable of communicating on the communication network, such as a cloud-based server computer, distributed server computer, server computer cluster, virtual server computer and the like. The server computer may be operated and/or maintained by or on behalf of a third party to both the merchant and consumer. The server computer may for example be operated by or on behalf of a financial institution (110). In some implementations, the server computer may be behind a firewall of the financial institution's IT infrastructure. The precise geographical location of the server computer may however be unknown and irrelevant to users of the system (such as the consumer and merchant). Depending on the implementation, the server computer may provide an authentication service and may for example implement or have access to one or more of: an access control server for three-domain secure-type authentication of transactions; an SRC participating issuer (SRCPI) component for enrolling a card holder and implementing or facilitating PAN and authorization related data requests; and a merchant code server interface for interfacing with a merchant code server.

The financial institution may perform the role of "issuer" to the consumer in that the financial institution maintains a financial account associated with the consumer against which the consumer can conduct transactions with, for example, the merchant. The server computer may thus be an issuer server computer. Of course, the financial institution may perform the role of issuer to many other consumers to allow each of these other consumers to conduct a financial transaction against respective financial accounts maintained by the financial institution. In some implementations, the financial institution (110) may be associated with a financial institution identifier which uniquely identifies the financial institution. In some cases, the financial institution identifier may be usable by a payment processing network in routing transaction/payment/authorization request messages and the like to the financial institution. The financial institution identifier may for example be in the form of a bank identification number (BIN).

The server computer (106) may have access to a financial account database (112) in which records (114) including data relating to the financial accounts of the respective consumers associated with the financial institution (110) may be stored. Each record (114) may be associated with a consumer identifier which uniquely identifies the consumer associated with that record. Each record may also store a communication address usable in directing messages to the consumer. The financial account database (112) may form part of a core banking back-end (115) of the financial institution by way of which the financial institution provides digital financial services to the consumer.

The server computer (106) may also have access to a transaction database (116). The transaction database may store records of historic transactions as well as records of potential future transactions. The transaction database (116) may store transactions of all consumers to whom the financial institution provides digital financial services. The records may be aggregated (e.g. deidentified, but grouped according to different categories, such as age, location, gender, socio-economic grouping, etc. of the consumers). The server computer (106) may also have access to a transaction-matrix database (118) in which consumer-linked transaction matrices may be stored. The transaction database (116) and transaction matrix database (118) may form part of a contextual data store (119) maintained by the financial institution for the purpose of providing contextual data to the consumer at the point of purchase.

The server computer (106) may be configured to detect that a consumer intends to conduct a transaction and to generate and transmit to the consumer contextual data relating to the consumer's intended transaction. The contextual data may be generated and transmitted in real-time (i.e. while the consumer is in the process of conducting the transaction and before the transaction is finalized). The contextual data may be generated based on data contained in one or more of the financial account database (112), the transaction database (116) and the transaction matrix database (118).

Figure 2:
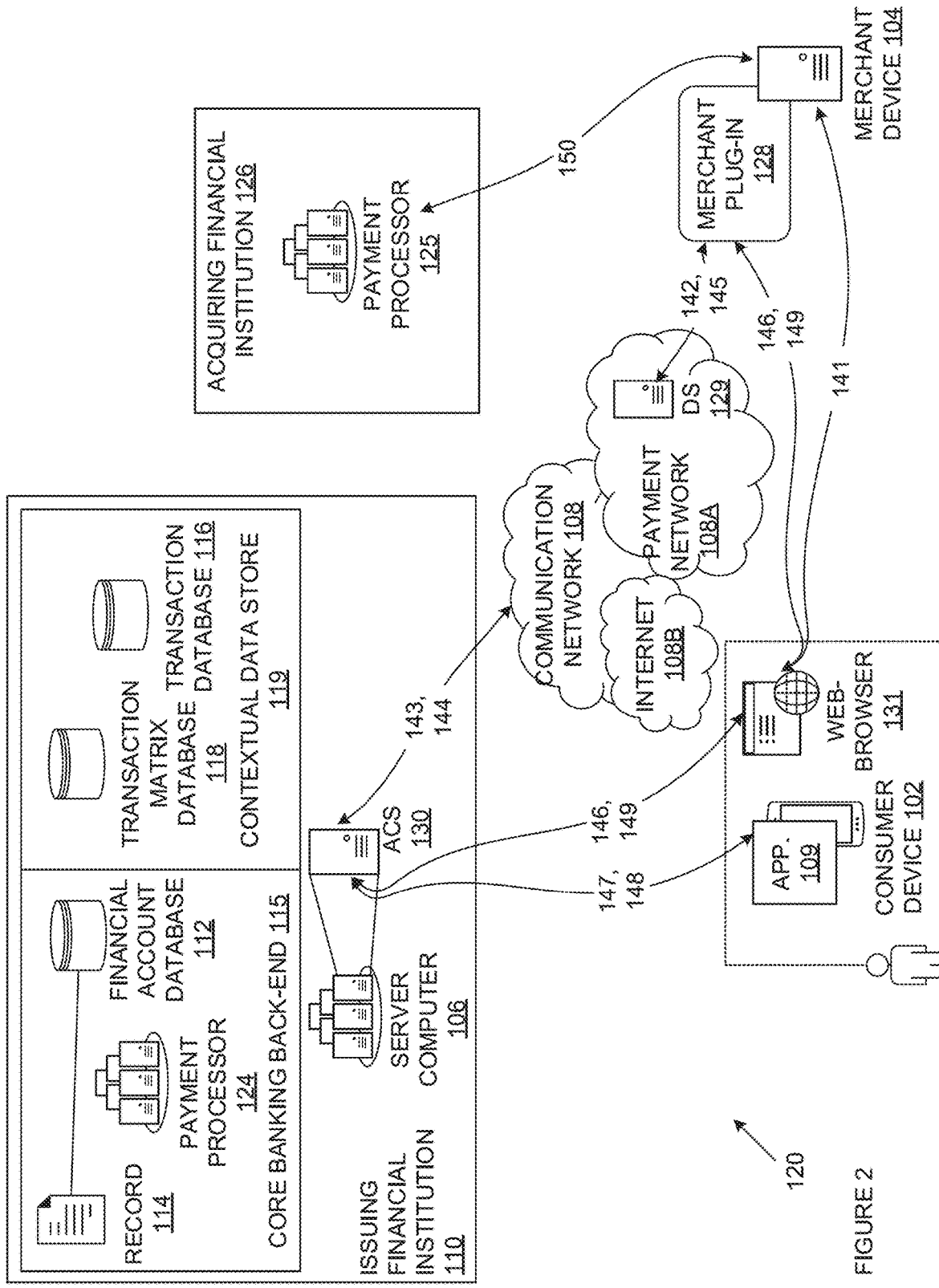
FIG. 2 is a schematic diagram which illustrates another exemplary system for providing computer-generated contextual data to an end-point during a digital transaction.
Figure 3:
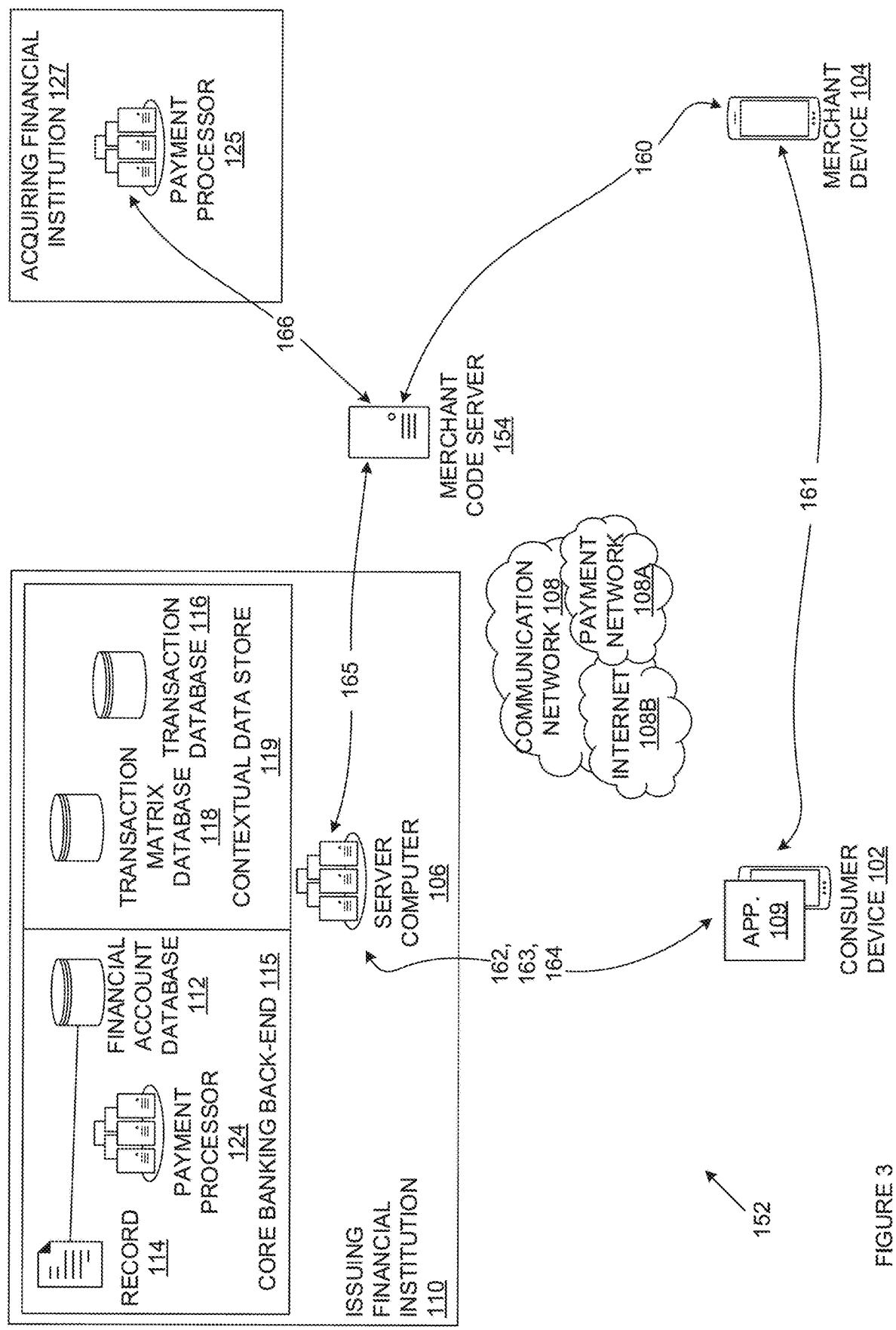
FIG. 3 is a schematic diagram which illustrates yet another exemplary system for providing computer-generated contextual data to an end-point during a digital transaction.

The system (100) described above may implement a method for providing computer-generated contextual data to an end-point during a digital transaction. The system may be incorporated into existing digital transaction systems so as to be able to provide the contextual data to the consumer in real time while the consumer is conducting a digital transaction. FIGS. 2 and 3 are schematic diagrams which illustrate exemplary embodiments in which the system of FIG. 1 is incorporated into two example digital transaction systems.

FIG. 2 illustrates an example integration into a 3DS-enabled digital transaction system (120). The system (120) includes the server computer (106), consumer device (102) and second device (104). In this example implementation, the second device is operated by a merchant and is hence termed a "merchant device".

The system (120) further includes an issuer payment processor (124) and acquirer payment processor (125). The payment processors (124, 125) communicate with each other via the payment network (108A) to authorize and transfer value from a financial account of the consumer maintained by the issuer payment processor (124) to a financial account of the merchant maintained by the acquirer payment processor (125). Communication between the payment processors may be via a suitable messaging protocol. The issuer payment processor (124) is operated by the issuing financial institution (110) while the acquirer payment processor (125) is operated by an acquiring financial institution (126).

In the illustrated embodiment, the merchant device (104) includes or has access to a merchant plug-in (MPI) (128), the payment network (108A) includes a directory server (DS) (129) and the issuing financial institution (110) has an access control server (ACS) (130). The ACS (130) may form a part of the server computer (106). In other words, the server computer may be configured to perform the functionality of the ACS as well as other functionality attributed to the server computer as described herein. The ACS may form part of an authentication service of the issuing financial institution. The MPI (128), directory server (129) and ACS (130) together enable a 3DS-type transaction authentication to be performed by the merchant.

In conducting an example digital transaction in the example system of FIG. 2, the consumer accesses (141) the merchant device (104) via a web-browser (131) executing on a computing device (which may be the consumer device (102) or another computing device to which the consumer has access). The consumer checks-out at the merchant site provided by the merchant device and enters or provides source of funds data (such as payment card details). The merchant device (104) implements the MPI (128), which contacts the directory server (129) to verify the enrolment of the source of funds data by sending (142) to the directory server a Verifying Enrolment Request (VEReq) message which includes source of funds data (such as a primary account number (PAN)). Based on the source of funds data, the directory server finds the ACS and contacts (143) it to determine whether the source of funds data is enrolled. The ACS responds (144) to the directory server, confirming whether or not the source of funds data is enrolled in the payment system.

The directory server responds (145) to the MPI with a Verifying Enrolment Response (VERes) message, confirming to the MPI whether or not the source of funds data is enrolled. If source of funds data is enrolled, the VERes message includes a URL of the issuing financial institution's ACS. The MPI redirects (146) the web-browser (131) to (or provides iFrame of) the ACS URL and adds, e.g. by way of a POST-request, a signed Payer Authentication Request (PAReq) message, which includes the source of funds data and transaction details. The effect of adding a PAReq message to a POST request is that the PAReq message is transmitted to the ACS from the MPI via the web-browser. The URL of the ACS may display a message to the consumer via the web-browser (131). The message may for example, instruct the user to be prepared to receive a transaction authorization request at the consumer device (102).

At this stage, the issuing financial institution (110) is aware that the consumer is in the process of conducting a digital transaction with the merchant. The issuing financial institution has access to the transaction details included in the PAReq or VEReq messages and knows the source of funds data with which the consumer intends completing the transaction. It is at this point that the server computer may be configured to generate contextual data, for example by evaluating the transaction details against the consumer-linked transaction matrix and generating a data message including information based on the evaluation and being relevant to the consumer. Due to transaction time out limitations imposed by the transaction system, the server computer may be required to generate the contextual data within strict time limits so as to avoid causing the transaction to time out.

The ACS may generate an authentication request message for transmission to the consumer device. The authentication request message may be configured for delivery to a particular software application executing on the consumer device (e.g. the software application). The authentication request message may therefore be sent to the consumer device via another channel, such as a secure communication channel established between the server computer (106) and the consumer device (or the software application (109) executing on the consumer device). In some implementations, the secure communication channel may ensure that data transmitted between the server computer and consumer device cannot be intercepted or altered by third parties. The authentication request message may function as a means to authenticate the consumer and/or the source of funds data provided by the consumer. The authentication request message may also function as transaction authorization in that the consumer is given opportunity to refuse the transaction if fraudulent.

The server computer (106) may bundle the data message (e.g. containing the contextual data) into the authentication request message and transmit (147) the authentication request message and data message to the consumer device (102). The messages may be transmitted via the secure communication channel. Bundling the data message into the authentication request message may ensure that the data message is seen by the consumer before the transaction is allowed to proceed. This is because the consumer needs to review and respond to the authentication request message before the transaction can continue.

The consumer device (102) may receive the authentication request message and the data message. The messages may be received via the secure communication channel. The messages may be received at the software application (109) via the secure communication channel. The consumer device may generate a prompt including the messages for display to the consumer. The prompt may be generated by the software application (109) and may serve as a notification to the consumer. The prompt may be configured to request authentication of the transaction by the consumer, for example by inputting into the web-browser a one-time PIN (OTP) included in the authentication request message or inputting into the computing device a registered password, registered biometric or the like. The prompt may include the data message which is displayed to the consumer.

In the illustrated embodiment, an authentication response message is transmitted (148) from the consumer device (or software application) to the ACS (130) via the secure communication channel and server computer (106). The authentication response message may be generated at the consumer device (e.g. by the software application) in response to the software application (109) verifying presentation by the consumer of a registered credential, such as a registered biometric or registered passcode. In other embodiments (e.g. in OTP-based implementations), the OTP may be input into the web-browser for submission to the ACS (130).

The ACS (130) may validate the authentication response message received from the web-browser (131) or software application (109) (as the case may be) and then redirects (149) the web-browser back to the MPI adding, e.g. by way of a POST-request, a Payer Authentication Response (PARes) message. The PARes is thus forwarded to the MPI (128) via the web-browser (131). The PARes includes the transaction status which indicates whether the consumer has been authenticated successfully. Depending on payment system rules and the transaction status in PARes message the merchant device can proceed with a payment authorisation request by submitting (150) the payment to the payment network (108A) via the acquiring financial institution (126) (e.g. by submitting a transaction request to the acquirer payment processor (125) for processing of the transaction via the payment network).

FIG. 3 illustrates an example integration into an example scan-to-pay enabled digital transaction system (152). It should be noted that the systems of FIGS. 2 and 3 are shown separately to simplify illustration and description of these two systems. It should however be appreciated that a composite system may be provided which provides the functionality of the systems of FIGS. 2 and 3. The system (152) includes the server computer (106), consumer device (102) and second device (104). In this example implementation, the second device is operated by a merchant and is hence termed a "merchant device".

The system (152) further includes the issuer payment processor (124) and acquirer payment processor (125) operated by the issuing and acquiring financial institutions (110, 127) respectively and which communicate with each other via the payment network (108A) to authorize and transfer value from a financial account of the consumer maintained by the issuer payment processor (124) to a financial account of the merchant maintained by the acquirer payment processor (125).

In the system (152) of FIG. 3, the merchant has access to a merchant code server (154) which is configured to provide transaction codes to the merchant for the purpose of accepting payments from the consumer. A transaction code may be transaction-specific code which uniquely identifies a transaction or a static code that, for example, identifies a particular merchant device at the merchant. The transaction code is configured for linking consumer source of funds data to a transaction to which the consumer is party in the digital transaction system. The transaction code is associated with transaction details, which may be received from the merchant. In some implementations, the transaction details are embedded in the transaction code, while in other embodiments the merchant code server stores the transaction details in association with the transaction code for providing to the issuing or acquiring financial institutions or the merchant. The transaction code is configured for output by the merchant device by way of optical, radio frequency, sound communication or the like. The merchant code server (154) is configured to communicate with the merchant device (104), acquirer payment processor (125) and server computer (106) via the communication network (108).

The merchant code server (154) provides (160) transaction codes to the merchant device for presentation to the consumer device. The consumer device acquires (161) and submits (162) the transaction code to the server computer, together with a payment instruction (including, e.g. source of funds data and transaction details). The server computer (106) obtains any necessary data from the issuer payment processor (124) and/or financial account database (112) (such as consumer details, account details, card details, authorization details, etc.). The server computer (106) may also obtain any necessary information from the merchant code provider, such as transaction details if these are not included in the transaction code.

At this stage, the issuing financial institution (110) is aware that the consumer is in the process of conducting a digital transaction with the merchant. The issuing financial institution has access to the transaction details (which may have been included in the transaction code received from the consumer device or obtained from the merchant code server using the transaction code) and knows the source of funds data with which the consumer intends completing the transaction. It is at this point that the server computer may be configured to generate contextual data, for example by evaluating the transaction details against the consumer-linked transaction matrix and generating a data message including information based on the evaluation and being relevant to the consumer. Due to transaction time out limitations imposed by the transaction system, the server computer may be required to generate the contextual data within strict time limits so as to avoid causing the transaction to time out.

The server computer may generate and transmit (163) an authentication request message to the consumer device (102) to authenticate the consumer and/or obtain the consumer's authorization for proceeding. The authentication request message may include the data message (including the contextual information). The authentication request message and data message may be transmitted via a secure communication channel and may be transmitted directly to the software application (109) executing on the consumer device.

The consumer device may receive the authentication request message and may prompt the consumer for authentication. The prompt may be generated by the software application (109) and may serve as a notification to the consumer. The prompt may be configured to request authentication of the transaction by the consumer, for example by inputting into the consumer device a registered password, registered biometric or the like. The prompt may include the data message which is displayed to the consumer. The consumer device (102) (or software application) transmits (164) an authentication response message to the server computer (106). The server computer receives and validates the authentication response message and submits (165) a payment instruction to the merchant code server (154). The payment instruction may include the source of funds data and the transaction code. The merchant code server (154) then submits (166) a transaction request to the acquirer payment processor (125) for processing of the transaction via the payment network.

Figure 4A:
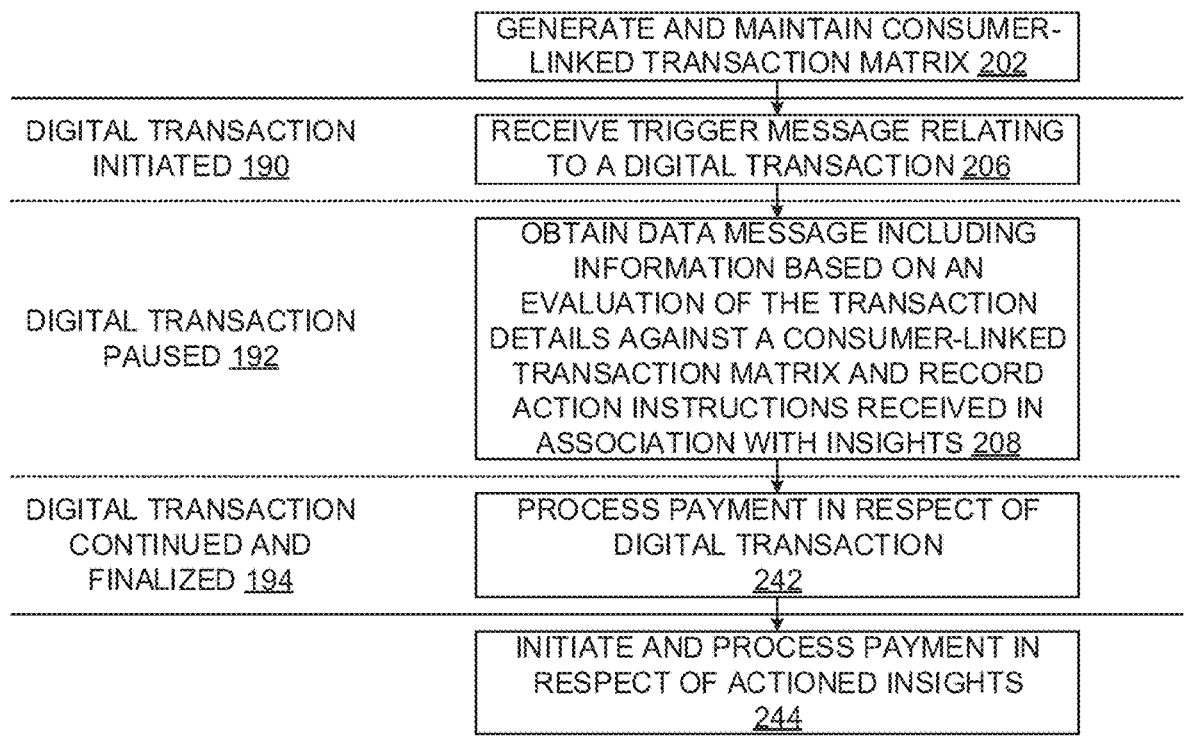
FIG. 4A is a flow diagram which illustrates an exemplary method for providing computer-generated contextual data to an end-point during a digital transaction.
Figure 4C:
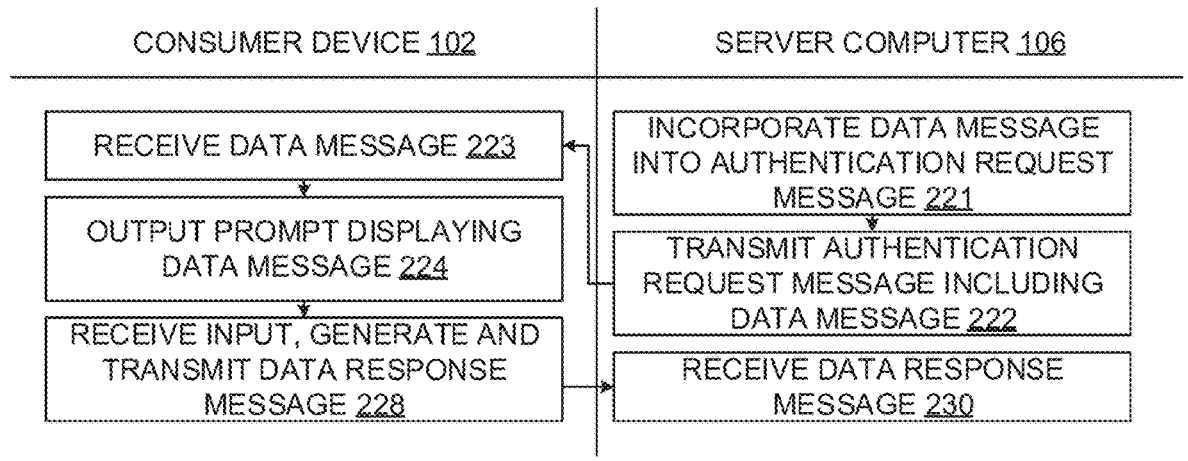
FIG. 4C is a swim-lane flow diagram which illustrates operations relating to transmitting a data message to a consumer device according to aspects of the present disclosure.
Figure 4B:
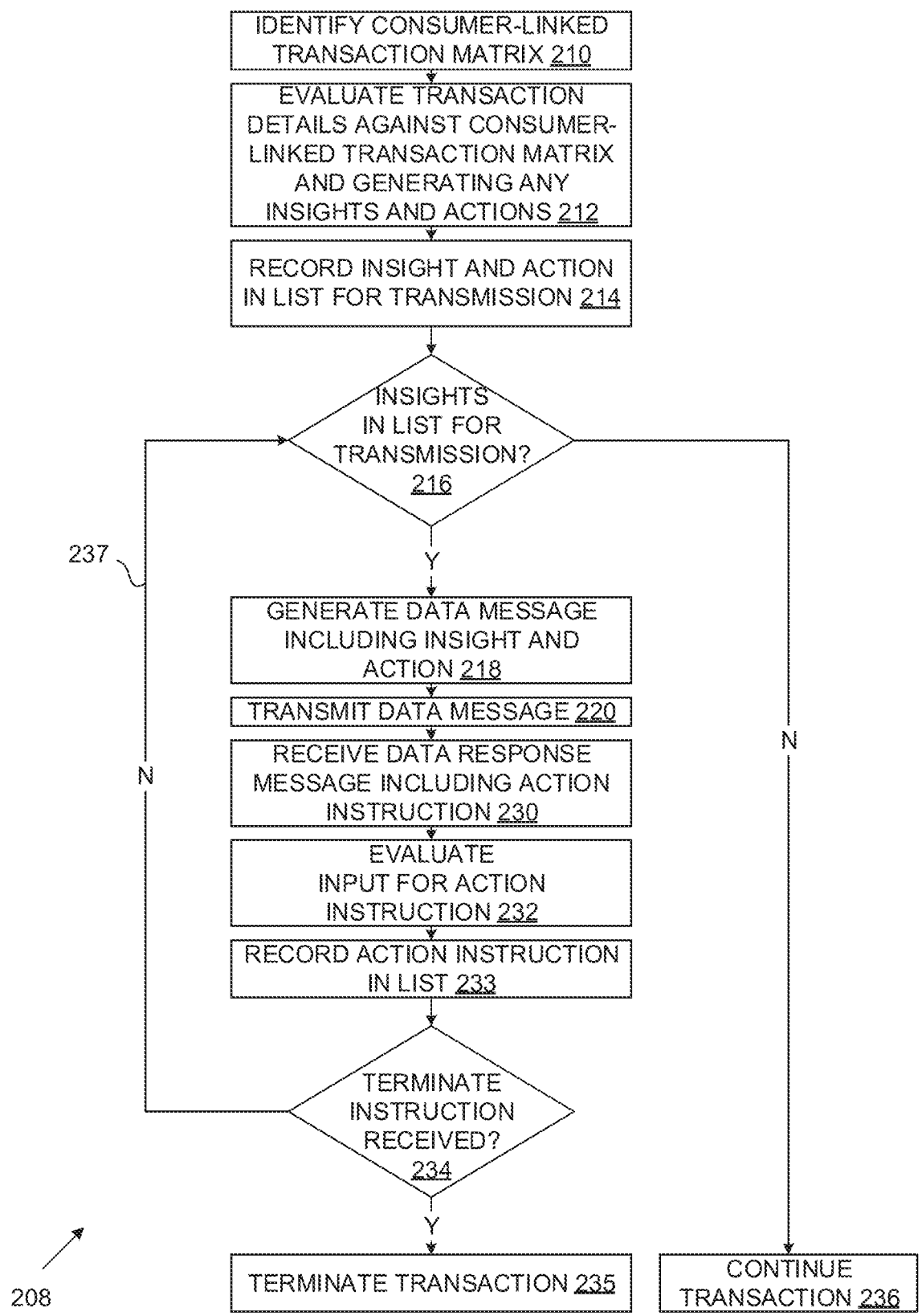
FIG. 4B is a flow diagram which illustrates operations relating to obtaining a data message including insights according to aspects of the present disclosure.

The systems (100, 120, 152) described above may implement a method for providing computer-generated contextual data to an end-point during a digital transaction. An exemplary method for providing computer-generated contextual data to an end-point during a digital transaction is illustrated in FIGS. 4A to 4C. The steps or operations illustrated in FIGS. 4A and 4B may be attributed to the server computer (106), although in other implementations these steps or operations may be performed by a number of different server computers (including e.g. one or more of a payment processor (124), access control server (130) and the like). Similarly, the steps or operations attributed to the server computer in FIG. 4C may be performed by other server computers.

Over time, and with reference initially to FIG. 4A, the server computer (106) may generate and maintain (202) a consumer-linked transaction matrix. The consumer-linked transaction matrix may be linked to a particular consumer and may be associated with the consumer identifier of that particular consumer. I.e., each consumer may have its own, unique consumer-linked transaction matrix.

The consumer-linked transaction matrix may be any suitable data structure or set of data elements which includes information relating to the digital transaction (such as information relating to the consumer and to consumers of the same category of consumer, etc.). The consumer-linked transaction matrix may be a dynamic array of data elements which develop over time as the behaviour of the consumer and related consumers change.

The transaction matrix generally includes information relating to the digital transaction. Such information may for example include one or more of information relating to transaction activity or habits of the particular consumer with which it is associated; information relating to transaction activity or habits of a category of consumers into which the particular consumer falls; information relating to particular transactions (which may be historic transactions and/or possible future transactions conducted by the consumer and/or other consumers); information relating to consumer spend propensity; budgeting guidelines; financial health or wellbeing of the consumer; merchant offers identified as being potentially relevant to the consumer, details of second entities which may be relevant to the consumer and the like. The consumer-linked transaction matrix may thus include information which is relevant to a particular transaction being conducted by the consumer at a particular time.

The server computer has access to the financial account database (112) in which records including data relating to the financial accounts of respective consumers associated with the financial institution are stored. Generating the consumer-linked transaction matrix may include accessing financial account data associated with a plurality of consumers, for example by accessing relevant records from the financial account database (112) and the transaction database (116) to extract relevant information for building the consumer-linked transaction matrix. The consumer-linked transaction matrix may thus include multiple dimensions of factors influencing the appropriateness of the transaction for the consumer. The consumer-linked transaction matrix includes decision logic which can pertain to previous patterns, target states and the like.

The consumer-linked transaction matrix may be configured for comparative-, artificial intelligence-, rules- and/or engine-based analysis or evaluation against transaction details relating to a pending transaction.

Generating the consumer-linked transaction matrix may include classifying the consumer into one or more consumer categories. Categories may be based on various discriminators, such as geography, age, income bracket, profession, hobbies, gender and the like. Generating the consumer-linked transaction matrix may include identifying other consumers falling into the same category for each of the categories into which the consumer is categorised and identifying transaction activity or habits associated with the consumers in each of the consumer categories. Identifying other consumers may be based on the financial account data associated with the respective consumers and, in some implementations, other data (such as know-your-customer data, etc.).

At some stage, a digital transaction may be initiated (190), for example, by a consumer proceeding to checkout in the context of an e-commerce type transaction, presenting goods for payment in a bricks-and-mortar retail environment or the like. The digital transaction may be between an entity associated with the consumer device (i.e. the consumer) and an entity associated with the second device (such as a merchant, AISP, PISP, etc.).

In the course of conducting the digital transaction (and, e.g., in response to its initiation), either one of the consumer device (102) or the second device (104) may generate and transmit a message to the server computer (106) which indicates to the server computer that the entity associated with the consumer device is in the process of conducting a digital transaction. The message may be a transaction request message or a transaction instruction message and may require some action from the server computer in order for the digital transaction to be completed. In the case of the digital transaction being a payment, the message may be a payment instruction message transmitted from a consumer device or payment request message transmitted from a merchant device.

The message may be transmitted to the server computer via the communication network (108). Depending on the implementation, this message may take on different forms (such as a VAReq, PAReq, payment response, push payment instruction, pull payment instruction, authorization request message, authentication response message, etc.) and may be termed a "trigger message" in that it triggers generation of the computer-generated contextual data for transmission during the transaction.

Depending on the implementation, the trigger message may include one or more of the following: source of funds data, transaction details, a transaction code, a consumer identifier, and the like.

In some implementations, the consumer identifier may be in the form of or may include source of funds data. In other words, the consumer may be identifiable by way of the source of funds data.

The transaction details may include one or more of an amount associated with the transaction, a digital transaction identifier, a second entity identifier (e.g. a merchant identifier), a merchant type identifier (e.g. a merchant category code), a description of the transaction, details of goods or services associated with the transaction (e.g. in some cases a stock keeping unit (SKU) or similar identifier associated with each of the goods), line item detail associated with the goods or services, and the like. Any one or more of the amount, merchant identifier, merchant type identifier, description of the transaction, details of goods or services, etc., may be considered a characteristic associated with the transaction.

In some implementations, the trigger message may be received from the second device (104), being a merchant device, via the acquirer payment processor (125) and payment network (108A). The trigger message may for example be an authorization request message transmitted from the merchant device to the issuing financial institution (110) to request authorization for a purchase to be made by a consumer in possession of the consumer device (102). The authorization request message may for example be a request from a point-of-sale terminal for authorization for a cardholder purchase (e.g. an ISO 8583 0100 message) or the like. In some implementations, the trigger message may be transmitted from the second device (104), being a merchant device, via the MPI (128) and directory server (129). The trigger message may for example be a VEReq message. In some implementations, the trigger message may be transmitted from a web-browser (131) executing on a computing device to which the consumer has access (which may be the consumer device or another device). The message may for example be a PAReq message. The trigger message may be transmitted via a POST-request. In some implementations, the trigger message may be transmitted from the consumer device (102), via the software application (109) executing on the consumer device. The trigger message may for example be a payment instruction message transmitted from the payment application to the server computer (106) in order to initiate a payment from a financial account associated with the source of funds data included in the message. In some implementations, the trigger message may be push payment instruction or pull payment instruction transmitted from the software application (e.g. in the form of a Web Payments payment app) or from the second device via the acquirer payment processer and payment network. In some implementations, the trigger message may be a payment instruction transmitted from an SRC initiator component associated with the second device to the server computer via an SRC system.

A device physically remote from the server computer may thus generate and transmit a trigger message to the server computer via the communication network.

The server computer (106) may receive (206) the trigger message from a remote device, such as the consumer device or the second (e.g. merchant) device. The trigger message may be received from the remote device via the communication network (108). The trigger message may be received during pendency of the transaction (i.e. while the transaction is pending and before it has been completed or cancelled). The trigger message may relate to a digital transaction, such as a financial transaction or digital payment being conducted between a consumer and a merchant.

As the trigger message is a transaction request message or transaction instruction message, which requests or requires an action from the server computer in order to process or complete the transaction, the server computer may be able to suspend or pause (192) processing of the transaction in response to receiving the trigger message. In some implementations, processing may be suspended or paused for a predetermined period after a data message has been transmitted to the consumer device (102) while in other implementations processing may be suspended until a data response message is received from the consumer device. The predetermined period of time may be based on any applicable timeout periods. For example the predetermined period of time may be selected to be less than an applicable timeout period to ensure that the transaction is allowed to proceed unless the consumer instructs otherwise.

The server computer (106) may obtain (208) a data message including information based on an evaluation of one or both of the transaction details and source of funds data against a consumer-linked transaction matrix. Obtaining the data message may include obtaining a data message including insights and, in some cases, actions associated with each insight. In some cases, multiple insights and associated actions may be generated. The insights and associated actions (if any) may be based on the evaluation of the transaction details against the consumer-linked transaction matrix. The information obtained (208) by the server computer may thus include an insight an optionally an action associated with the insight. An action may be a prompt to the consumer to take an action or make a decision in respect of the insight included in the data message.

With reference now to FIG. 4B, obtaining (208) the data message may include the server computer identifying (210) a consumer-linked transaction matrix which is associated with the consumer identifier. This may include querying a transaction matrix database using the consumer identifier.

The server computer (106) may evaluate (212) the transaction details and/or source of funds data against the consumer-linked transaction matrix. The evaluation may be configured to identify insights present in the consumer-linked transaction matrix which pertain to the transaction details and/or source of funds data. The evaluation may be performed using suitable algorithms, such as artificial intelligence/machine learning algorithms (e.g. pattern matching, classification, clustering, etc.), rules engines or the like.

Evaluating (212) the transaction details against the consumer-linked transaction matrix may include evaluating consistency/inconsistency of the transaction details against the consumer-linked transaction matrix. Evaluating consistency may include determining whether or not the transaction details conform to any patterns associated with the matrix. Evaluating consistency may include determining the extent to which the transaction details converge with, or diverge from, any patterns associated with the matrix.

For example, one pattern associated with the matrix may be that in any given month the consumer typically spends within a range of $50 to $60 for the type of goods in respect of which the transaction is being conducted (e.g. e-books). If the pending transaction relates to the purchasing of the same type of good (i.e. an e-book), evaluating the consistency of the transaction may include determining the amount that the consumer has spent on these goods thus far in the month. If the pending transaction still fits within the typical range, the pending transaction may be determined to be consistent. If not, it may be determined to be inconsistent.

Another exemplary pattern may be that other consumers in the same category as the consumer typically purchase the relevant product or service with which the transaction is associated from a particular merchant, at a particular time of the month, together with one or more other products/services, or the like. If the pending transaction relates to the purchasing of dog food, for example, evaluating the consistency of the transaction may include determining whether the merchant associated with the pending transaction is the particular merchant from whom other consumers typically buy their dog food and/or whether the transaction is taking place at the particular time of the month. If the pending transaction is being conducted with the particular merchant and/or at the particular time of month, it may be determined to be consistent. Otherwise, it may be determined to be inconsistent.

In some implementations, the consumer-linked transaction matrix may include information relating to particular (historic or potential) transactions. For example, the particular transactions may include transactions for which related goods/services are precisely indicated (e.g. by way of an SKU or the like). A particular historic transaction may be a transaction conducted by another consumer in the same category as the consumer. A particular potential transaction may be an offer of sale made by a merchant in relation to a particular good/service.

The transaction details included in the trigger message may similarly include information which precisely indicates the goods/services to which the transaction relates and evaluating consistency of the transaction details against the consumer-linked transaction matrix may include comparing the transaction details to one or more particular transactions stored in the consumer-linked transaction matrix. Evaluating consistency of the transaction details against the consumer-linked transaction matrix may include using the goods/services indication to identify corresponding particular transactions and, for example, comparing the amount included in the transaction details with an amount associated with the one or more matching particular transactions. If the amount is within a predetermined range of the particular transaction amount (e.g. within 3, 4 or 5 percent), the transaction details may be determined to be consistent with the matrix. Otherwise, they may be determined to be inconsistent.

Evaluation (212) of the transaction details against the consumer-linked transaction matrix may include identifying other products/services related to the products/services to which the transaction relates and which the consumer may wish to purchase at the same time.

Evaluation (212) of the transaction details against the consumer-linked transaction matrix may include identifying a more suitable time for the transaction to be concluded (e.g. a time that is more conducive to the consumer's budget, cash flow, needs and the like).

Evaluating (212) the transaction details against the consumer-linked transaction matrix may include performing any suitable comparative-, artificial intelligence-, rules- and/or engine-based analysis or evaluation of the transaction details against the matrix.

Evaluating (212) the transaction details against the consumer-linked transaction matrix may include generating information based on the evaluation. The information may include insights and (optionally) actions based on the evaluation. For example, each insight generated based on the evaluation may have an action associated therewith. The action may for example be an action to effect or follow a recommendation of the insight. Some insights may not have associated actions, and may be generated to relay to the consumer insight relating to the transaction (and being relevant in some way to the consumer). Each insight may for example be in the form of a character string including data based on the evaluation of the transaction details (e.g. "You will receive more loyalty points if you use source of funds X. Do you want to use this source of funds?"). Each action may similarly be a character string including data describing a potential action based in the insight (e.g. "yes I want to use this source of funds", or simply "yes").

The server computer (106) may record (214) any insights and any associated actions in a list or other suitable data structure. The list or data structure may be linked to the digital transaction (e.g. by generating the list and associating it with a transaction identifier). The digital transaction may thus have a list of insights and associated actions having been generated based on an evaluation of transaction details against the consumer linked transaction matrix. The list may also include a field to indicate whether or not the insight and associated action have been transmitted to the consumer device.

The server computer (106) may evaluate the list to determine whether or not there are any insights and associated actions in the list which still need to be transmitted to the consumer device. This may include evaluating the appropriate field for each insight in the list.

If (216) there are no insights and associated actions that need to be transmitted to the consumer device, the server computer (106) may allow the transaction to continue (236).

If there are insights (and optional associated actions) that need to be transmitted to the consumer device, the server computer (106) may, for each insight in the list, generate (218) a data message including information based on the evaluation and being relevant to the consumer. Generating (218) the data message may include generating a data message including the insight and the associated action, if any. The information may be relevant to the consumer in that it is actionable by the consumer. The information may be relevant to the consumer and the pending transaction and may relate to whether or not the transaction should be continued to completion. The information may for example include recommendations along the lines of "It is recommended that you do not go through with this purchase", "You can purchase the same product for cheaper elsewhere", "This falls outside your budget, consider making this purchase at a later stage", "Consumers similar to you normally purchase X instead", "Would you like to purchase insurance for this product too?", and the like.

The data message may include an action associated with the insight and may thus be configured to prompt the consumer for a response, for example, an instruction to proceed with or to cancel the transaction. The data message may for example be a call to action, requiring the consumer to perform an action before the transaction is allowed to proceed. The data message may be interactive in that it requires a response from the consumer to be transmitted to the server computer.

As mentioned, in the case of evaluating consistency/inconsistency of the transaction details against the consumer-linked transaction matrix, and if the transaction details are consistent with the consumer-linked transaction matrix, processing of the transaction may be resumed and the transaction may be allowed to proceed as normal. This may include terminating suspension of processing of the transaction. In other implementations, if the transaction details are consistent with the consumer-linked transaction matrix, the server computer may generate and transmit a data message including information relating to the consistency. The information relating to the consistency may for example include a confirmation that the transaction is 'normal' for consumers similar to this consumer, that the price is reasonable, or the like.

If the transaction details are inconsistent with the consumer-linked transaction matrix, the data message generated by the server computer (106) may include information (e.g. an insight and action) relating to the inconsistency.

Generating (218) the data message may thus include generating a data message including information relating to remedying the inconsistency. This may include generating a suggestion as to an alternative transaction. The alternative transaction may be based on the inconsistency.

For example, referring to the e-book scenario mentioned above, if the pending transaction does not fit within the typical range, the data message may include information indicating this inconsistency and/or suggest an alternative transaction. For example, the data message may read "You are about to spend more on e-books this month than you normally do. Do you want to proceed with the transaction or do you want to buy something else?"

Referring to the dog food example, if the pending transaction is inconsistent, the data message may read "Consumers similar to you typically purchase their dog food from Peter's Pets. Do you want to continue or do you want to browse the inventory at Peter's Pets?"

Referring to the particular goods example, in the case of an inconsistency in respect of the price of a particular good the data message may read "This camping mattress is cheaper at Camping Cave. Do you want to continue or visit Camping Cave's website?"

In some cases, the information relating to remedying the inconsistency may suggest delaying the transaction to a point in time at which the transaction details are likely to be consistent with the consumer-linked transaction matrix. For example, if the evaluation determines that the particular purchase exceeds a suggested or predefined budget for such purchases, the data message may suggest delaying the purchase to a point in time at which the purchase will be within the consumer's budget (e.g. in the next month, after the consumer has received his or her pay check, etc.).

Further, in some cases, the data message may include information relating to another transaction (e.g. a suggested transaction). The other transaction may for example suggest a related purchase or an associated value add (e.g. insurance).

The server computer (106) may transmit (220) the data message to a device with which the consumer interacts during the transaction via the communication network (108). The device may be a consumer device (102) associated with the consumer. In other cases (e.g. in the case of a bricks-and-mortar transaction), the device may be the second device (104). The data message is transmitted during pendency of the transaction (i.e. before the transaction is finalised and/or aborted) and may be configured to cause the consumer device to output a prompt displaying the data message. As mentioned, the data message may include information relating to the inconsistency, which may include a computer-generated suggestion as to an alternative transaction. Transmitting (220) the data message may include updating the relevant field associated with the insight in the list to indicate that the insight has been transmitted to the consumer.

In some implementations, for example as illustrated in FIG. 4C, the server computer (106) may incorporate the data message into an authentication request message. In such an implementation, the authentication request message may read "Authentication requested for purchase of $40 from Outdoor Oaks. Do you want to continue?" The authentication request message may include some or all of the transaction details and may prompt the consumer for authorization or approval of the transaction. In some implementations, the authentication request message may also include a one-time PIN (OTP) which is generated by the server computer and which is required to be provided to the server computer in order for the consumer to authorise the transaction. The authentication request message may be such as those described above with reference to FIGS. 2 and 3.

In such implementations, transmitting the data message may include incorporating (221) or bundling the data message into the authentication request message. This may include altering the authentication request message to include the data message. Incorporating the data message into the authentication request message may include passing the data message to an authentication component for inclusion into the authentication request message. Transmitting the data message may thus include transmitting (222) an authentication request message into including the data message. Incorporating the data message into the authentication request message may include interacting with an authentication service of the issuing financial institution to obtain the authentication request message and/or to send the combined message and receive the relevant response.

The consumer device (102) may receive (223) the data message. The message may be received from the server computer (106) via the communication network (108). In some implementations, the data message may be included in an authentication request message requesting the consumer to confirm or deny its intended performance of the transaction (e.g. a 3-D Secure message or the like). In some implementations, the authentication request message may require the consumer to input a registered credential into the consumer device in order to authenticate and/or authorize the transaction. In other implementations, the authentication request message may include an OTP for input into a computing device via which the consumer is conducting the transaction (e.g. into a web-browser for transmission to an ACS).

The consumer device (102) may output (224) a prompt displaying the data message (and authentication request message, if required). In some cases, the consumer device may also output an alert (e.g. a haptic and/or audio alert). Exemplary data messages being output are illustrated in FIGS. 6 to 8.

It should be appreciated that in a practical implementation of the described method, the operations performed between the server computer receiving (206) the trigger message and the consumer device (102) receiving the data message should be performed in a short time period (e.g. in the order of seconds or even milliseconds). For example, the operations may be performed within time limits imposed by any relevant transaction timeout periods.

If the data message and/or authentication request message requests a response from the consumer, the consumer may input his or her action instruction. A data message including an action associated with the insight is an example of a data message requesting a response. An action instruction may be an instruction to proceed with a particular action associated with the insight included in the data message.

Exemplary action instructions that may be input include whether to continue, abort and/or augment the transaction and/or possibly whether to enter into a second transaction (e.g. in respect of related goods/services). The consumer may input his or her action instructions via an input/output (I/O) device (such as a mouse, touchpad, keyboard, microphone, touch-sensitive display, input buttons, and the like) associated with the consumer device. In some implementations, the authentication request message may require input of registered credential, which may be in the form of a registered passcode input via a touch-sensitive display or a registered biometric input via fingerprint reader and/or camera of the consumer device.

The consumer device (102) may receive the input and may generate and transmit (228) a data response message to the server computer (106). The data response message may include the input and may be transmitted via the communication network (108). If input of a registered credential is required, the consumer device may validate the registered credential and generate proof of the validation for inclusion in an authentication response message. The proof of validation may be in the form of a cryptogram or set of data elements signed by the consumer device (of the software application executing on the consumer device) for validation by the server computer. The data response message and authentication response message may be sent together (e.g. in a composite message) or as two separate messages.

The server computer (106) may receive (230) the data response message. The data response message may include the input (in the form of an action instruction) instructing the server computer how to proceed with the transaction (e.g. continuance, augmentation and/or termination (as the case may be) of the transaction).

The server computer (106) may evaluate (232) the input included in the data response message for an instruction as to how to proceed in respect of the transaction. Evaluating the input may include parsing the data response message to identify an action instruction included therein. Exemplary action instructions include continuing with the transaction, aborting the transaction, adding to the transaction and augmenting the transaction. In some cases, the input may include instructions as to a second transaction which is to be initiated once the pending transaction has been processed as instructed. Evaluating the input may include evaluation the data response message for a response to the authentication request and passing the relevant response to the authentication service for the appropriate treatment of the transaction (e.g. allowing to continue or terminating, as the case may be).

In some cases, a data response message instructing augmentation of the digital transaction is received, and the server computer may generate an augmentation instruction for transmission to the second device including details relating to the augmentation that is to occur. The transaction may continue to pend while augmentation thereof is finalised. The augmentation instruction may for example require the second device to update the transaction details in accordance with the augmentation details, for example to include a related product or service in the consumer's cart before finalizing checkout, etc. The augmentation instruction may include information that was provided to the consumer in the data message (e.g. details of a duvet cover that is suggested to be purchased with a mattress, etc.).

The server computer (106) may record (233) the action instruction received in the data response message in the list in association with the relevant insight. The server computer may thus update the list to record the action instruction received from the consumer device.

If a data response message instructing continuance of the transaction is received, processing of the transaction may resume (234). This may result in processing of the transaction against a financial account associated with the consumer in favour of a financial account associated with the merchant to continue as normal.

If (234) a data response message instructing termination of the transaction is received, the server computer may terminate (235) the transaction.

If (234) there is no termination action instruction, the method loops (237) and the server computer (106) may check the list to determine whether there are any insights for transmission to the consumer mobile device. While (216) there are insights in the list for transmission, the server computer (106) continues generating data messages including the relevant insight and action (if any) and transmitting them to the consumer for evaluation and actioning. When (216) there are no longer any insights in the list remaining to be transmitted, the server computer (106) may allow (236) the transaction to continue.

Once the all the insights have been transmitted to the consumer and relevant action instructions received, the digital transaction continues (194) to completion. This may include the server computer processing (242) payment in respect of the digital transaction. Processing payment may include transmitting relevant notifications to the consumer device and/or second device advising of the transaction status so that the goods or services in question may be handed over.

The server computer (106) may for example transmit a notification message to the second device (104). The notification message may for example notify the merchant that the transaction has been allowed to proceed and that the second device can finalise the transaction and release the relevant goods/services. In other cases, the notification message may notify the second device that the transaction has been terminated. In some cases, the notification message may instruct the second device to augment the transaction. This may require the second device to update the transaction details according to information included in the notification message (e.g. to include a related product or service in the consumer's cart before finalizing checkout, etc.).

The second device (104) may receive the notification message and initiate an appropriate action based on the content of the notification message. If the notification message confirms that the transaction has been allowed to proceed, the second device (104) may for example finalise the transaction and release the relevant goods/services in the consumer cart. If the notification message confirms that the transaction has been terminated, the second device (104) may for example cancel or terminate the transaction. If the notification message instructs augmentation of the transaction, the second device may proceed to augment the transaction as instructed, for example by updating the cart to include an associated good or service that the consumer has requested to be purchased in addition to the existing purchases. In some implementations, the augment instruction may also permit the updated or augmented transaction to be finalised without any further approval from the consumer and/or server computer.

Processing (242) payment may include finalizing any authentication/authorization routines or procedures that were paused while the insights were generated and communicated to the consumer. Processing (242) the transaction may include the server computer initiating a settlement and reconciliation process with the second entity.

In some cases, an action instruction relating to a second, further digital transaction may be received in a data response message. With the initial (or primary or originating) transaction finalised, the server computer may initiate (244) and process payment in respect of a second transaction in respect of the merchant or another, third party merchant as the case may be. The second transaction may be initiated whether the pending transaction proceeds, is terminated or is augmented. Initiating the second transaction may include querying the list for further transactions in respect of which affirmative action instruction responses have been received. Initiating the second transaction may include transmitting a transaction initiation message to the relevant entity associated with the second transaction. The notification may include details relevant to the second transaction, such as one or more of source of funds data, the consumer identifier and relevant transaction details.

It should be appreciated that the method described above may be performed in real-time (or as near to real-time as practically possible) and while processing of the transaction is pending. From the perspective of the consumer, the method may resemble the familiar transaction authentication/authorisation procedure imposed by 3-D Secure/Web Payments/Secure Remote Commerce/etc., except in that contextual data relating to the pending transaction is communicated to the consumer from a trusted (and from the perspective of the transaction) impartial source.

Aspects of the disclosure may thus provide a system and method for providing computer-generated contextual data to an end-point during a digital transaction (e.g. to a consumer at the point of purchase). Aspects of the disclosure anticipate e-commerce- and bricks-and-mortar-based implementations in which computer-generated contextual data is generated and transmitted to a consumer in real-time while the consumer is conducting a transaction. Transactions may be detected and contextual data may be generated by a server computer, typically maintained and/or operated by or on behalf of an issuer financial institution associated with the consumer. By doing so, a payment mechanism-agnostic system and method may be provided. In other words, regardless of the way in which the consumer transacts (e.g. via credit card at bricks-and-mortar or e-commerce merchants, mobile wallet linked to the consumer financial account or the like), if the transaction goes via the financial institution then inconsistencies can be identified and contextual data can be generated. Furthermore, by integrating the described system and method into the infrastructure of the issuer financial institution, contextual data can be integrated into an authentication request message—a point at which the issuer already has the consumer's attention and at which the consumer is required to scrutinise the transaction.

Figure 5:
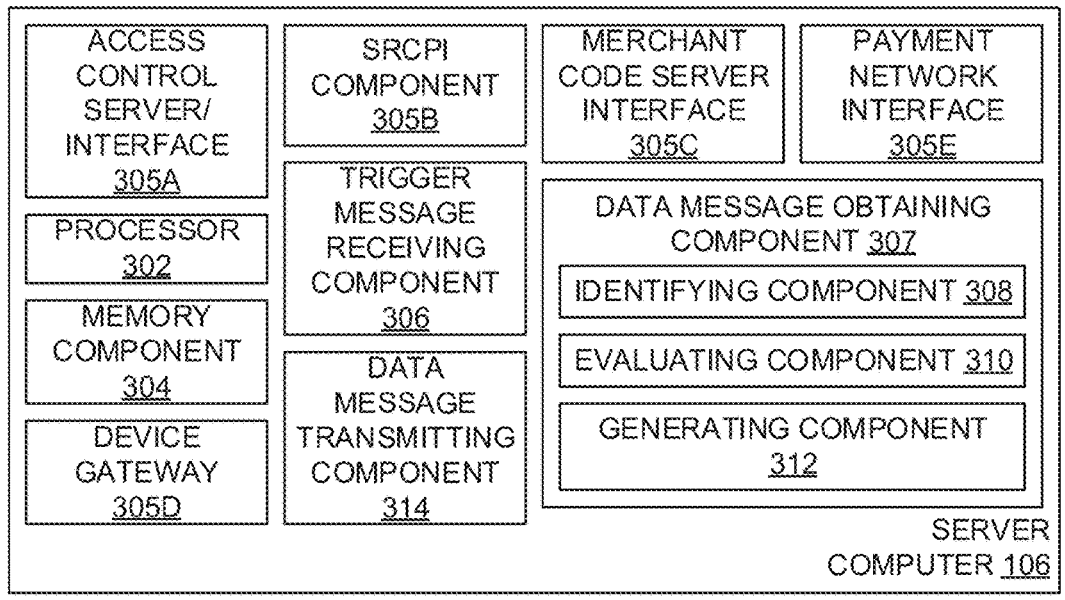
FIG. 5 is a block diagram which illustrates exemplary components which may be provided by a system for providing computer-generated contextual data to an end-point during a digital transaction.

Various components may be provided for implementing the method described above with reference to FIGS. 4A to 4C. FIG. 5 is a block diagram which illustrates exemplary components which may be provided by a system for providing computer-generated contextual data to an end-point during a digital transaction. The system may include a server computer (106).

The server computer (106) may include a processor (302) for executing the functions of components described below, which may be provided by hardware or by software units executing on the server computer (106). The software units may be stored in a memory component (304) and instructions may be provided to the processor (302) to carry out the functionality of the described components. In some cases, for example in a cloud computing implementation, software units arranged to manage and/or process data on behalf of the server computer (106) may be provided remotely.

Depending on the implementation, the server computer (106) may include one or more of the following: an access control server or access control server interface (305A) for interfacing with an access control server; an SRC participating issuer (SRCPI) component (305B); and a merchant code server interface (305C) for interfacing with a merchant code server. The server computer (106) may include a device gateway (305D) for interfacing with the consumer device (102) via the communication network (108). The device gateway (305D) may be configured to identify the consumer device (102), establish a secure communication channel with the consumer device, authenticate the consumer device, and the like. The device gateway may be configured to establish the secure communication channel with the software application executing on the consumer device, authenticate the software application, and the like. The server computer (106) may also include a payment network interface (305E) arranged to interface with the payment network (108A).

The server computer (106) may include a trigger message receiving component (306) arranged to receive a trigger message relating to digital transaction being conducted between two entities. The trigger message may be received from a remote device (such as the consumer device or second device) via a communication network (108). The trigger message may be received via the access control server or access control server interface (305A), SRCPI component (305B), device gateway (305D) or payment network interface (305E). The trigger message may be received during pendency of the digital transaction.

The server computer (106) may include a data message obtaining component (307) arranged to obtain a data message including information based on an evaluation of the transaction details against a consumer-linked transaction matrix.

The data message obtaining component (307) may include an identifying component (308) arranged to identify the transaction matrix linked to the consumer. The consumer-linked transaction matrix may at least include information relating to transaction activity or habits of a category of consumers into which the consumer falls.

The data message obtaining component (307) may include an evaluating component (310) arranged to evaluate the transaction details against the consumer-linked transaction matrix. The evaluating component (310) may be configured to evaluate consistency of the transaction details against the consumer-linked transaction matrix.

The data message obtaining component (307) may include a generating component (312) arranged to generate a data message including information based on the evaluation and being relevant to the consumer. The information may for example relate to an inconsistency between the transaction details and the consumer-linked transaction matrix. The information may be relevant to the consumer in that it is actionable by the consumer (e.g. "It is recommended that you do not go through with this purchase", "You can purchase the same product for cheaper elsewhere", "This falls outside your budget, consider making this purchase at a later stage", "Consumers similar to you normally purchase X instead", "Would you like to purchase insurance for this product too?", etc.).

The data message obtaining component (307) may include a data message outputting component for outputting the data message for transmission to a remote device.

The server computer (106) may include a data message transmitting component (314) arranged to transmit the data message via a communication network to a device with which the consumer interacts. The device may be a consumer device (102) or the second device (104) (e.g. the merchant device). The data message may be transmitted during pendency of the transaction and may be configured to cause the consumer device to output a prompt displaying the data message.

FIGS. 6 to 8 are schematic diagrams which illustrate exemplary in-use scenarios of the described system and method from the perspective of a consumer (400).

With reference to FIG. 6, the consumer may interact with a second entity in the form of a merchant for the purpose of conducting a digital transaction. The merchant may be an e-commerce merchant and the consumer may thus transact with the merchant from a remote location (e.g. from the consumer's home) via a web-browser executing on a computing device (401) accessible to the consumer. The consumer may interact with the merchant via a website and/or software application installed on the computing device associated with the consumer.

The consumer may select goods for purchasing from the merchant and may add the goods to a cart. When ready, the consumer may select a checkout (402) option in response to which the merchant determines the total amount owing by the consumer for the goods in the cart. The merchant may prompt the consumer for payment and the consumer may input source of funds data, such as payment card details, details of a mobile wallet which the consumer wishes to make use of or the like. In any event, in interacting with the merchant, the consumer may provide to the merchant data which is usable by the merchant in obtaining payment from a financial institution associated with the consumer.

Once the consumer has provided the payment details and instructed payment, the merchant may transmit a message to a financial institution associated with the consumer. The message may be in the form of any one of the possible trigger messages as described in the foregoing. The financial institution may receive the trigger message and evaluate transaction details included in the trigger message against a consumer-linked transaction matrix. If any inconsistencies are identified, the financial institution may generate and transmit a data message (404) which is received at and displayed by the consumer device (102). The data message (404) may include information (406) relating to remedying the inconsistency. In the illustrated embodiment, the data message is incorporated into an authentication request message (405).

In the scenario illustrated in FIG. 6, the information relating to the inconsistency recites "Your account will be overdrawn if you proceed with this purchase". In another exemplary scenario, the inconsistency may be that the consumer has already spent a predefined or suggested camping gear budget for the month, in which case the information relating to remedying the inconsistency may recite "This purchase will make you exceed your camping gear budget for the month?". Either the authentication request message or the data message may include an input component (408) requiring user input as to how to proceed. In the illustrated example, activating the 'yes' input component may lead to the consumer device requesting input of a registered credential in order to authenticate the consumer.

In some cases, the information included in the data message and having been generated based on the evaluation of the transaction details against the consumer-linked transaction matrix includes a suggestion as to a further, potentially associated, purchase.

In the scenario illustrated in FIG. 7, for example, the data message (414) may include information or an insight (416) which suggests a further, associated purchase being insurance for the mattress that is being purchased. If the consumer accepts the purchase (by selecting the "yes" action instruction), the initial purchase may be allowed to proceed and the consumer may then be routed to a site or portal configured for providing or selling the associated purchase (e.g. an insurance platform or application resident on the consumer device).

In the exemplary scenario illustrated in FIG. 8, the information or insight (426) included in the data message (424) indicates that if another source of funds is used, the consumer would qualify for free purchase protection. The information has been generated based on the evaluation of the transaction details and source of funds data against the consumer linked transaction matrix. The data message includes actions in the form of either accepting the proposed change of source of funds data (by selecting "yes") or declining the advice and proceeding with the transaction in its current form (by selecting "no").

The consumer (400) can review the data message and decide whether or not to proceed with the transaction. The consumer can input his or her selection, in this case via graphical icons (408) displayed on a touch-sensitive display of the consumer device.

Previously, transactions were authenticated in the context (environment) of the merchant who would never want to run the risk of the user not approving, and thus is not incentivized to give trusted advice. In the present disclosure, financial health impact of the transaction on the consumer and other factors may be assessed in real-time, during pendency of the transaction, and communicated to the consumer for consideration while the transaction is pending. Aspects of the present disclosure enable such advice to be linked to the authentication/consent action rather than the shopping action.

In implementing some aspects of the present disclosure, integration with the merchant may be obviated and it may be that only bank integration is required (which may be relatively easy as the bank must do authentication anyway). Furthermore, in accordance with aspects of the present disclosure, the user's consent is not requested based on transaction risk, but rather based on financial health. The bank knows it is the user, but perhaps advises against executing the transaction.

Aspects of the present disclosure provide for a data message including insights and action options to be transmitted via a data communication network to a device on which the consumer can interact during the transaction (such as a consumer device or a merchant device. The insights and action options are displayed to the consumer on the device enabling the consumer to optionally choose an action to take. This is done during pendency of the transaction. The action selected by the consumer (if any) is submitted to the server computer, from where the server computer can act on it (e.g. to continue or cancel and optionally augment the set of actions or steps to be taken by the server computer as part of the transaction finalization).

Figure 9:
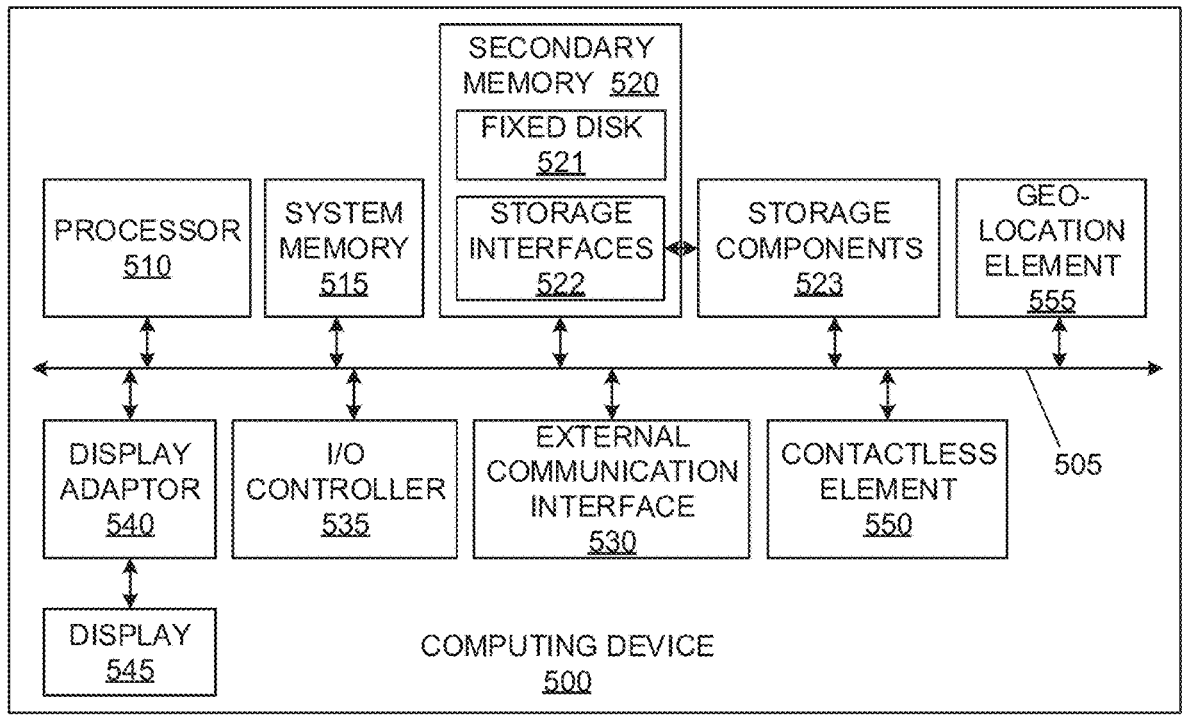
FIG. 9 illustrates an example of a computing device in which various aspects of the disclosure may be implemented.

FIG. 9 illustrates an example of a computing device (500) in which various aspects of the disclosure may be implemented. The computing device (500) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (500) may be suitable for storing and executing computer program code. The various participants and elements in the previously described system diagrams may use any suitable number of subsystems or components of the computing device (500) to facilitate the functions described herein. The computing device (500) may include subsystems or components interconnected via a communication infrastructure (505) (for example, a communications bus, a network, etc.). The computing device (500) may include one or more processors (510) and at least one memory component in the form of computer-readable media. The one or more processors (510) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (500) may be distributed over a number of physical locations (e.g. in a distributed, cluster or cloud-based computing configuration) and appropriate software units may be arranged to manage and/or process data on behalf of remote devices.

The memory components may include system memory (515), which may include read only memory (ROM) and random access memory (RAM). A basic input/output system (BIOS) may be stored in ROM. System software may be stored in the system memory (515) including operating system software. The memory components may also include secondary memory (520). The secondary memory (520) may include a fixed disk (521), such as a hard disk drive, and, optionally, one or more storage interfaces (522) for interfacing with storage components (523), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (500) may include an external communications interface (530) for operation of the computing device (500) in a networked environment enabling transfer of data between multiple computing devices (500) and/or the Internet. Data transferred via the external communications interface (530) may be in the form of signals, which may be electronic, electromagnetic, optical, radio, or other types of signal. The external communications interface (530) may enable communication of data between the computing device (500) and other computing devices including servers and external storage facilities. Web services may be accessible by and/or from the computing device (500) via the communications interface (530).

The external communications interface (530) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (530) may include a subscriber identity module (SIM) in the form of an integrated circuit that stores an international mobile subscriber identity and the related key used to identify and authenticate a subscriber using the computing device (500). One or more subscriber identity modules may be removable from or embedded in the computing device (500).

The external communications interface (530) may further include a contactless element (550), which is typically implemented in the form of a semiconductor chip (or other data storage element) with an associated wireless transfer element, such as an antenna. The contactless element (550) may be associated with (e.g., embedded within) the computing device (500) and data or control instructions transmitted via a cellular network may be applied to the contactless element (550) by means of a contactless element interface (not shown). The contactless element interface may function to permit the exchange of data and/or control instructions between computing device circuitry (and hence the cellular network) and the contactless element (550). The contactless element (550) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (500) and an interrogation device. Thus, the computing device (500) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (510). A computer program product may be provided by a non-transient computer-readable medium, or may be provided via a signal or other transient means via the communications interface (530).

Interconnection via the communication infrastructure (505) allows the one or more processors (510) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (500) either directly or via an I/O controller (535). One or more displays (545) (which may be touch-sensitive displays) may be coupled to or integrally formed with the computing device (500) via a display (545) or video adapter (540).

The computing device (500) may include a geographical location element (555) which is arranged to determine the geographical location of the computing device (500). The geographical location element (555) may for example be implemented by way of a global positioning system (GPS), or similar, receiver module. In some implementations the geographical location element (555) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (500). In some implementations, the geographical location element (555) may implement inertial navigation to track and determine the geographical location of the computing device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A computer-implemented method conducted at a server computer operated or maintained by or on behalf of a financial institution maintaining a financial account against which a consumer transacts, the method comprising:
   receiving, at the server computer from a remote device via a data communication network, a trigger message relating to a digital transaction between the consumer and a second entity, the trigger message indicating that the consumer is in the process of conducting the digital transaction, the trigger message including a consumer identifier uniquely associated with the consumer and transaction details including a characteristic associated with the digital transaction, wherein the trigger message is received during pendency of the digital transaction;
   suspending, at the server computer, processing of the transaction in response to receiving the trigger message; and:
   obtaining, at the server computer, a data message including information based on an evaluation of the transaction details against a consumer-linked transaction matrix, the consumer-linked transaction matrix being linked to the consumer and at least including information relating to the digital transaction, wherein the information included in the data message includes advice relating to the transaction and an associated action prompt;
   transmitting, from the server computer via a data communication network, the data message to a remote device with which the consumer interacts, wherein the data message is configured to cause the remote device with which the consumer interacts to output a prompt to the consumer displaying the data message; and
   continuing processing of the transaction by the server computer after a data response message instructing continuance of the transaction is received from the remote device with which the consumer interacts or after a predetermined period of time after the data message has been transmitted,
   wherein the second entity is a merchant of goods or services and wherein the trigger message is a transaction authorization request message received from a merchant device, and
   wherein the transaction details include one or more of an amount associated with the transaction, a merchant identifier, and details of goods or services associated with the transaction.

2. The method as claimed in claim 1, wherein the trigger message is a transaction instruction message received from a consumer device or transaction request message received from a second device associated with the second entity participating in the digital transaction.

3. The method as claimed in claim 1, wherein the trigger message is a Payer Authentication Request message received from a merchant device.

4. The method as claimed in claim 1, wherein the remote device with which the consumer interacts is a merchant device or a consumer device.

5. The method as claimed in claim 1, wherein the data message is included in an authentication request message including at least a subset of the transaction details and prompting the consumer to authenticate the transaction, and wherein transmitting the data message includes transmitting the authentication request message including the data message to a consumer device.

6. The method as claimed in claim 1, wherein the server computer is operated or maintained by or on behalf of a third party to both the consumer and the second entity.

7. The method as claimed in claim 1, including generating and maintaining the consumer-linked transaction matrix, including accessing financial account data associated with a plurality of consumers.

8. The method as claimed in claim 1, wherein the server computer has access to a financial account database in which records including data relating to the financial accounts of respective consumers are stored.

9. The method as claimed in claim 1, wherein the data message is configured to prompt the consumer for a response, and wherein the response is an instruction to alter, proceed with, add to or cancel the transaction.

10. The method as claimed in claim 1, wherein obtaining the data message includes:
identifying a transaction matrix linked to the consumer, the consumer-linked transaction matrix at least including information relating to the digital transaction;
evaluating the transaction details against the consumer-linked transaction matrix;
and,
generating the data message including information based on the evaluation and being relevant to the consumer.

11. The method as claimed in claim 1, including:
in response to receiving a data response message instructing augmentation of the digital transaction, generating an augmentation instruction for transmission to a second device, the augmentation instruction including augmentation details relating to the augmentation; or,
in response to receiving a data response message instructing continuance of the transaction, processing the transaction against a financial account associated with the consumer in favour of a financial account associated with the second entity.

12. The method as claimed in claim 11, wherein the augmentation details include information that was provided to the consumer in the data message, wherein the augmentation instruction requires the second device to update the transaction details in accordance with the augmentation details, and wherein the augmentation instruction requires the second device to update the transaction details to include a related product or service.

13. The method as claimed in claim 1, wherein the information relating to the digital transaction includes one or both of information relating to transaction activity of a category of consumers into which the consumer falls and information relating to transaction activity of the consumer.

14. The method as claimed in claim 1, wherein the consumer identifier is in the form of or includes source of funds data.

15. The method as claimed in claim 1, wherein the data message includes a character string including data describing the advice and a potential action based on the advice so as to prompt to the consumer to take the action or make a decision in respect of the advice, and wherein the method includes receiving a data response message including input in the form of an action instruction instructing how to proceed with the transaction, the action instruction being one of: continue the transaction, abort the transaction, augment the transaction or enter into a second transaction.

16. The method as claimed in claim 1, including suspending processing of the transaction for a predetermined period of time, wherein the predetermined period of time is based on a timeout period selected to ensure that the transaction is allowed to proceed unless the consumer instructs otherwise.

17. A system including a server computer operated or maintained by or on behalf of a financial institution maintaining a financial account against which a consumer transacts, the server computer comprising:
a processor and a memory configured to provide computer program instructions to the processor to execute functions of components;
a trigger message receiving component for receiving, from a remote device via a data communication network, a trigger message relating to a digital transaction between the consumer and a second entity, the trigger message including a consumer identifier uniquely associated with the consumer and transaction details including a characteristic associated with the digital transaction, wherein the trigger message is received during pendency of the digital transaction;
a data message obtaining component for obtaining a data message including information based on an evaluation of the transaction details against a consumer-linked transaction matrix, the consumer-linked transaction matrix being linked to the consumer and at least including information relating to the digital transaction, wherein the information included in the data message includes an insight advice relating to the transaction and an associated action prompt; and,
a data message transmitting component for transmitting, via a data communication network, the data message to a remote device with which the consumer interacts, wherein the data message is configured to cause the remote device with which the consumer interacts to output a prompt to the consumer displaying the data message;
a transaction suspending component for suspending processing of the transaction in response to receiving the trigger message until a data response message instructing continuance of the transaction is received from the remote device with which the consumer interacts or after a predetermined period of time after the data message has been transmitted,
wherein the server computer has access to a financial account database associated with a plurality of consumers to generate and maintain the consumer-linked transaction matrix
wherein the second entity is a merchant of goods or services and wherein the trigger message is a transaction authorization request message received from a merchant device, and
wherein the transaction details include one or more of an amount associated with the transaction, a merchant identifier, and details of goods or services associated with the transaction.

18. A computer program product comprising a computer-readable medium having stored computer-readable program code for performing, at a server computer operated or maintained by or on behalf of a financial institution maintaining a financial account against which a consumer transacts, the steps of:

receiving, at the server computer from a remote device via a data communication network, a trigger message relating to a digital transaction between the consumer and a second entity, the trigger message including a consumer identifier uniquely associated with the consumer and transaction details including a characteristic associated with the digital transaction, wherein the trigger message is received during pendency of the digital transaction;

suspending, at the server computer, processing of the transaction in response to receiving the trigger message; and:

obtaining, at the server computer, a data message including information based on an evaluation of the transaction details against a consumer-linked transaction matrix, the consumer-linked transaction matrix being linked to the consumer and at least including information relating to the digital transaction, wherein the information included in the data message includes advice relating to the transaction and an associated action prompt; and, transmitting, from the server computer via a data communication network, the data message to a remote device with which the consumer interacts, wherein the data message is configured to cause the remote device with which the consumer interacts to output a prompt to the consumer displaying the data message; and continuing processing of the transaction by the server computer after a data response message instructing continuance of the transaction is received from the remote device with which the consumer interacts or after a predetermined period of time after the data message has been transmitted, wherein the second entity is a merchant of goods or services and wherein the trigger message is a transaction authorization request message received from a merchant device, and wherein the transaction details include one or more of an amount associated with the transaction, a merchant identifier, and details of goods or services associated with the transaction.

\* \* \* \* \*